United States Patent
Teyeb et al.

(10) Patent No.: US 11,659,447 B2
(45) Date of Patent: May 23, 2023

(54) FLOW CONTROL FOR INTEGRATED ACCESS BACKHAUL (IAB) NETWORKS

(71) Applicant: Telefonaktiebolaget LM Ericsson (publ), Stockholm (SE)

(72) Inventors: Oumer Teyeb, Solna (SE); Gunnar Mildh, Sollentuna (SE); Ajmal Muhammad, Sollentuna (SE); Jose Luis Pradas, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 119 days.

(21) Appl. No.: 17/253,819

(22) PCT Filed: Jul. 16, 2019

(86) PCT No.: PCT/IB2019/056068
§ 371 (c)(1),
(2) Date: Dec. 18, 2020

(87) PCT Pub. No.: WO2020/031004
PCT Pub. Date: Feb. 13, 2020

(65) Prior Publication Data
US 2021/0211939 A1  Jul. 8, 2021

Related U.S. Application Data

(60) Provisional application No. 62/716,022, filed on Aug. 8, 2018.

(51) Int. Cl.
*H04W 28/12* (2009.01)
*H04W 28/02* (2009.01)
(Continued)

(52) U.S. Cl.
CPC ....... *H04W 28/12* (2013.01); *H04W 28/0278* (2013.01); *H04W 28/0284* (2013.01);
(Continued)

(58) Field of Classification Search
CPC ...................................................... H04W 4/18
See application file for complete search history.

(56) References Cited

U.S. PATENT DOCUMENTS

| 9,408,109 B2 | 8/2016 | Jonsson et al. |
| 2003/0174647 A1 | 9/2003 | Gutierrez et al. |

(Continued)

FOREIGN PATENT DOCUMENTS

| CA | 2311888 A1 | 12/2000 |
| CN | 1291028 A | 4/2001 |

(Continued)

OTHER PUBLICATIONS

"3GPP TS 29.281 V13.0.0", 3rd Generation Partnership Project; Technical Specification Group Core Network and Terminals; General Packet Radio System (GPRS) Tunnelling Protocol User Plane (GTPv1-U) (Release 13), Sep. 2015, pp. 1-28.
"3GPP TS 38.474 V15.0.0", 3rd Generation Partnership Project; Technical Specification Group Radio Access Network; NG-RAN; F1 data transport (Release 15), Jan. 2018, pp. 1-8.
"3GPP TS 38.401 V15.1.0", 3rd Generation Partnership Project; Technical Specification Group Radio Access Network; NG-RAN; Architecture description (Release 15), Mar. 2018, pp. 1-23.
(Continued)

*Primary Examiner* — San Htun
(74) *Attorney, Agent, or Firm* — Murphy, Bilak & Homilier, PLLC

(57) ABSTRACT

Embodiments of the present disclosure include methods, performed by a first node in an integrated access backhaul (IAB) network, for flow control of data transmission from a base station to a plurality of user equipment (UEs) via the IAB network. Such embodiments can include detecting a reduction in data transmission throughput in the first node, and determining that the reduction in data transmission throughput is due to congestion in one or more particular downstream nodes in the IAB network. Such embodiments can also include sending a flow-control message to an upstream node in the IAB network, wherein the flow-control message identifies one or more nodes, in the IAB network, for which a flow-control operation is requested in relation to data transmitted from the upstream node. Other embodi- (Continued)

ments include complementary methods performed by a second node (e.g., upstream from the first node) and IAB nodes configured to perform such methods.

24 Claims, 19 Drawing Sheets

(51) Int. Cl.
*H04W 40/12* (2009.01)
*H04W 40/24* (2009.01)

(52) U.S. Cl.
CPC ....... *H04W 28/0289* (2013.01); *H04W 40/12* (2013.01); *H04W 40/24* (2013.01)

(56) References Cited

U.S. PATENT DOCUMENTS

| | | | | |
|---|---|---|---|---|
| 2009/0135824 A1* | 5/2009 | Liu | ............... | H04W 40/28 370/392 |
| 2010/0260096 A1* | 10/2010 | Ulupinar | ............... | H04W 76/12 370/315 |
| 2010/0309788 A1* | 12/2010 | Ho | ............... | H04W 28/22 370/236 |
| 2011/0026398 A1 | 2/2011 | Natarajan et al. | | |
| 2012/0155276 A1* | 6/2012 | Vasseur | ............... | H04L 45/04 370/237 |
| 2012/0287790 A1 | 11/2012 | Huang et al. | | |
| 2013/0070600 A1 | 3/2013 | Nakajima et al. | | |
| 2015/0208316 A1* | 7/2015 | Mosko | ............... | H04W 28/10 370/238 |
| 2016/0218983 A1 | 7/2016 | Dao et al. | | |
| 2016/0285537 A1 | 9/2016 | Maaref et al. | | |
| 2017/0006499 A1* | 1/2017 | Hampel | ............... | H04W 40/02 370/236 |
| 2019/0327644 A1 | 10/2019 | Gao et al. | | |

FOREIGN PATENT DOCUMENTS

| | | |
|---|---|---|
| CN | 107409438 A | 11/2017 |
| CN | 107210908 B | 6/2021 |
| EP | 2448194 A1 | 5/2012 |
| JP | 2011239322 A | 11/2011 |
| JP | 2016523036 A | 8/2016 |
| RU | 2543996 C2 | 3/2015 |
| WO | 2014179722 A1 | 11/2014 |
| WO | 2018121096 A1 | 7/2018 |

OTHER PUBLICATIONS

"3GPP TS 38.473 V15.2.1", 3rd Generation Partnership Project; Technical Specification Group Radio Access Network; NG-RAN; F1 application protocol (F1AP) (Release 15), Jul. 2018, pp. 1-161.
"3GPP TS 38.470 V15.2.0", 3rd Generation Partnership Project; Technical Specification Group Radio Access Network; NG-RAN; F1 general aspects and principles (Release 15), Jun. 2018, pp. 1-12.
"3GPP TS 38.425 V15.1.0", 3rd Generation Partnership Project; Technical Specification Group Radio Access Network; NG-RAN; NR user plane protocol (Release 15), Mar. 2018, pp. pp. 1-19.
"3GPP TS 38.300 V15.2.0", 3rd Generation Partnership Project; Technical Specification Group Radio Access Network; NR; NR and NG-RAN Overall Description; Stage 2 (Release 15), Jun. 2018, pp. 1-87.
"3GPP TR 38.874 V0.2.1", 3rd Generation Partnership Project; Technical Specification Group Radio Access Network; Study on Integrated Access and Backhaul; (Release 15), May 2018, pp. 1-19.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TS 33.401 V15.4.0", 3rd Generation Partnership Project; Technical Specification Group Services and System Aspects; 3GPP System Architecture Evolution (SAE); Security architecture (Release 15), Jun. 2018, pp. 1-162.
"3GPP TS 23.501 V15.2.0", 3rd Generation Partnership Project; Technical Specification Group Services and System Aspects; System Architecture for the 5G System; Stage 2 (Release 15), Jun. 2018, pp. 1-217.
"Protection of internal gNB interfaces", 3GPP TSG-SA WG3 Meeting #91 Bis, S3-181838, La Jolla (US), May 21-25, 2018, pp. 1-2.
Tuexen, M., et al., "Datagram Transport Layer Security (DTLS) for Stream Control Transmission Protocol (SCTP)", Internet Engineering Task Force (IETF); Request for Comments: 6083; Category: Standards Track; ISSN: 2070-1721, Jan. 2011, pp. 1-9.
Ericsson et al., "The consequences of not using SCTP/IP for F1-AP transport", 3GPP TSG-RAN WG2 AH1807, Montreal, Canada, Jul. 2-6, 2018, pp. 1-5, R2-1810565, 3GPP.
Huawei et al., "Adaptation layer design", 3GPP TSG-RAN WG3 #Ad Hoc 1807, Montreal, Canada, Jul. 2-6, 2018, pp. 1-5, R3-183784, 3GPP.
LG Electronics Inc., "Flow control in IAB node", 3GPP TSG-RAN WG2 NR Ad Hoc #4, Montreal, Canada, Jul. 2-6, 2018, pp. 1-2, R2-1810432, 3GPP.
Sequans Communications, "Flow control considerations for IAB", 3GPP TSG-RAN WG2#NR AH1807, Montreal, Canada, Jul. 2-6, 2018, pp. 1-4, R2-1810451, 3GPP.

\* cited by examiner

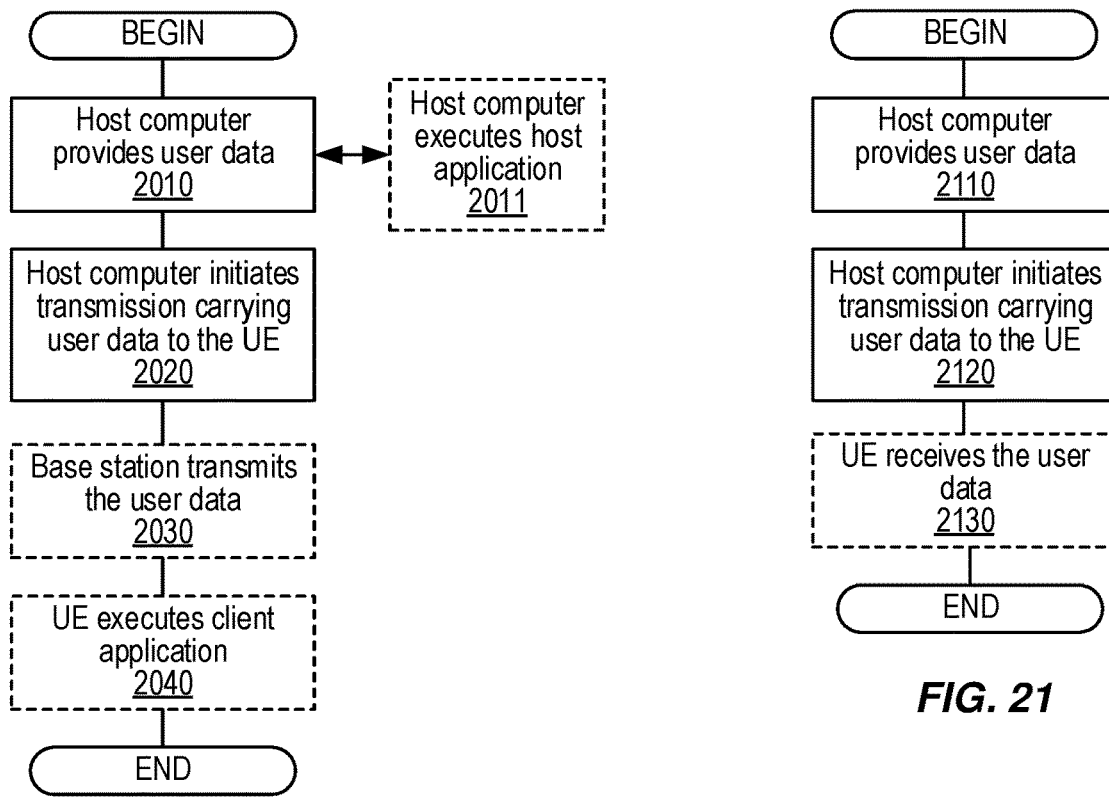
FIG. 20
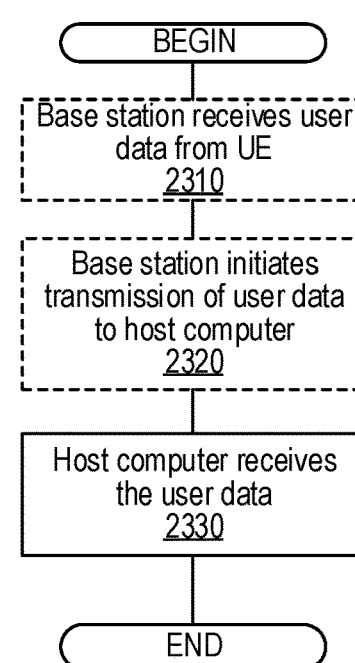
FIG. 21
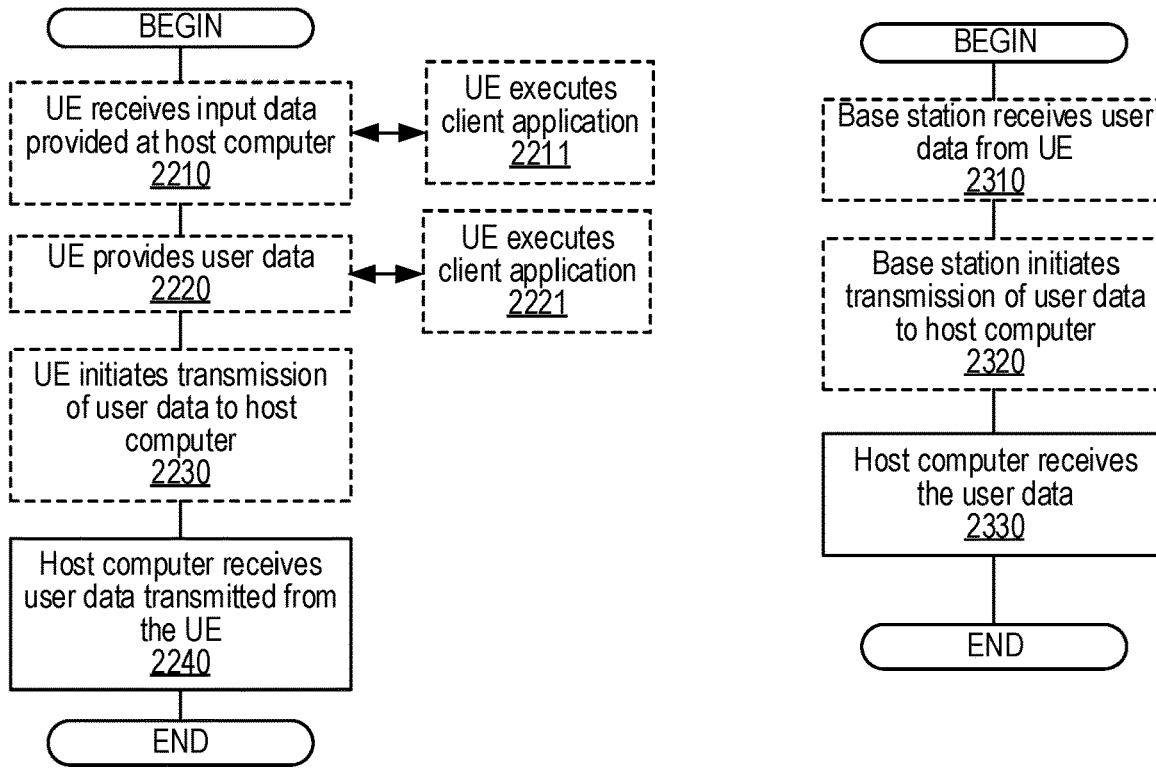
FIG. 22
FIG. 23

FLOW CONTROL FOR INTEGRATED ACCESS BACKHAUL (IAB) NETWORKS

TECHNICAL FIELD

The present application relates generally to the field of wireless communication networks, and more specifically to integrated access backhaul (IAB) networks in which the available wireless communication resources are shared between user access to the network and backhaul of user traffic within the network (e.g., to/from a core network).

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

FIG. 1 illustrates a high-level view of the 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMF) in the 5GC 198 via respective NG-C interfaces. Similarly, gNBs 100, 150 can be connected to one or more User Plane Functions (UPFs) in 5GC 198 via respective NG-U interfaces.

Although not shown, in some deployments 5GC 198 can be replaced by an Evolved Packet Core (EPC), which conventionally has been used together with a Long-Term Evolution (LTE) Evolved UMTS RAN (E-UTRAN). In such deployments, gNBs 100, 150 can connect to one or more Mobility Management Entities (MMEs) in EPC 198 via respective S1-C interfaces. Similarly, gNBs 100, 150 can connect to one or more Serving Gateways (SGWs) in EPC via respective NG-U interfaces.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 1 (and described in 3GPP TS 38.401 and 3GPP TR 38.801) include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU. Furthermore, the F1 interface between the gNB-CU and gNB-DU is specified and/or based on the following general principles:

- F1 is an open interface;
- F1 supports the exchange of signalling information between respective endpoints, as well as data transmission to the respective endpoints;
- from a logical standpoint, F1 is a point-to-point interface between the endpoints (even in the absence of a physical direct connection between the endpoints);
- F1 supports control plane and user plane separation into respective F1-AP and F1-U protocols, such that a gNB-CU may also be separated in CP and UP;
- F1 separates Radio Network Layer (RNL) and Transport Network Layer (TNL);
- F1 enables exchange of user-equipment (UE) associated information and non-UE associated information;
- F1 is defined to be future proof with respect to new requirements, services, and functions;
- A gNB terminates X2, Xn, NG and S1-U interfaces and, for the F1 interface between DU and CU, utilizes the F1-AP protocol that is defined in 3GPP TS 38.473.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

It has also been agreed in 3GPP RAN3 Working Group (WG) to support a separation of the gNB-CU into a CU-CP function (including RRC and PDCP for signaling radio bearers) and CU-UP function (including PDCP for user plane). The CU-CP and CU-UP parts communicate with each other using the E1-AP protocol over the E1 interface. The CU-CP/UP separation is illustrated in FIG. 2.

Densification via the deployment of more and more base stations (e.g., macro or micro base stations) is one of the mechanisms that can be employed to satisfy the increasing demand for bandwidth and/or capacity in mobile networks, which is mainly driven by the increasing use of video streaming services. Due to the availability of more spectrum in the millimeter wave (mmw) band, deploying small cells that operate in this band is an attractive deployment option for these purposes. However, the normal approach of connecting the small cells to the operator's backhaul network with optical fiber can end up being very expensive and impractical. Employing wireless links for connecting the small cells to the operator's network is a cheaper and more practical alternative. One such approach is an integrated access backhaul (IAB) network where the operator can utilize part of the radio resources for the backhaul link.

IAB has been studied earlier in 3GPP in the scope of Long Term Evolution (LTE) Rel-10. In that work, an architecture was adopted where a Relay Node (RN) has the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node(2) on the same Donor eNB from the CN. During the Rel-10 study, other architectures were also considered including, e.g., where the RNs are more transparent to the Donor gNB and allocated a separate stand-alone P/S-GW node.

For 5G/NR, similar options utilizing IAB can also be considered. One difference compared to LTE is the gNB-CU/DU split described above, which separates time critical RLC/MAC/PHY protocols from less time critical RRC/PDCP protocols. It is anticipated that a similar split could also be applied for the IAB case. Other IAB-related differences anticipated in NR as compared to LTE are the support of multiple hops and the support of redundant paths.

FIG. 3 shows a reference diagram for an IAB network in standalone mode, as further explained in 3GPP TR 38.874 (version 0.2.1). The IAB network shown in FIG. 3 includes one IAB-donor 340 and multiple IAB-nodes 311-315, all of which can be part of a radio access network (RAN) such as an NG-RAN. IAB donor 340 includes DUs 321, 322 connected to a CU, which is represented by functions CU-CP 331 and CU-UP 332. IAB donor 340 can communicate with core network (CN) 350 via the CU functionality shown.

Each of the IAB nodes 311-315 connects to the IAB-donor via one or more wireless backhaul links (also referred to herein as "hops"). More specifically, the Mobile-Termination (MT) function of each IAB-node 311-315 terminates the radio interface layers of the wireless backhaul towards a corresponding "upstream" (or "northbound") DU function. This MT functionality is similar to functionality that enables UEs to access the IAB network and, in fact, has been specified by 3GPP as part of the Mobile Equipment (ME).

In the context of FIG. 3, upstream DUs can include either DU 321 or 322 of IAB donor 340 and, in some cases, a DU function of an intermediate IAB node that is "downstream" (or "southbound") from IAB donor 340. As a more specific example, IAB-node 314 is downstream from IAB-node 312 and DU 321, IAB-node 312 is upstream from IAB-node 314 but downstream from DU 321, and DU 321 is upstream from IAB-nodes 312 and 314. The DU functionality of IAB nodes 311-315 also terminates the radio interface layers toward UEs (e.g., for network access via the DU) and other downstream IAB nodes.

As shown in FIG. 3, IAB-donor 340 can be treated as a single logical node that comprises a set of functions such as gNB-DUs 321-322, gNBCU-CP 331, gNB-CU-UP 332, and possibly other functions. In some deployments, the IAB-donor can be split according to these functions, which can all be either co-located or non-co-located as allowed by the 3GPP NG-RAN architecture. Also, some of the functions presently associated with the IAB-donor can be moved outside of the IAB-donor if such functions do not perform IAB-specific tasks. Each IAB-node DU connects to the IAB-donor CU using a modified form of F1, which is referred to as F1*. The user-plane portion of F1* (referred to as "F1*-U") runs over RLC channels on the wireless backhaul between the MT on the serving IAB-node and the DU on the IAB donor.

In addition, an adaptation layer is included to hold routing information, thereby enabling hop-by-hop forwarding by IAB nodes. In some sense, the adaptation layer replaces the IP functionality of the standard F1 stack. F1*-U may carry a GTP-U header for the end-to-end association between CU and DU (e.g., IAB-node DU). In a further enhancement, information carried inside the GTP-U header can be included into the adaption layer. Furthermore, in various alternatives, the adaptation layer for IAB can be inserted either below or above the RLC layer. Optimizations to RLC layer itself are also possible, such as applying ARQ only on the end-to-end connection (i.e., between the donor DU and the IAB node MT) rather than hop-by-hop along access and backhaul links (e.g., between downstream IAB node MT and upstream IAB node DU).

Nevertheless, using RLC ARQ hop-by-hop can have several advantages as compared to end-to-end RLC ARQ. At the same time, however, using hop-by-hop RLC ARQ can introduce various problems with packet losses on the PDCP layer above RLC, particularly for certain arrangements of the adaptation layer in the overall protocol stack.

SUMMARY

Accordingly, exemplary embodiments of the present disclosure address these and other difficulties in configuration and/or management of a 5G network comprising IAB nodes, thereby enabling the otherwise-advantageous deployment of IAB solutions.

Exemplary embodiments includes methods and/or procedures for flow control of data transmission from a base station to a plurality of user equipment (UE) via an integrated access backhaul (IAB) network. The exemplary methods and/or procedures can be performed by a first node in the IAB network (e.g., downstream from a second node).

The exemplary methods and/or procedures can include detecting a reduction in data transmission throughput in the first node. The exemplary methods and/or procedures can also include determining that the reduction in data transmission throughput is due to congestion in one or more particular downstream nodes in the IAB network. The exemplary methods and/or procedures can also include sending a flow-control message to an upstream node in the IAB network. The flow-control message can identify one or more nodes, in the IAB network, for which a flow-control operation is requested in relation to data transmitted from the upstream node. In some embodiments, the flow-control message can identify the one or more nodes based on identifying one or more radio bearers associated with one or more UEs being served by the nodes. In some embodiments, the flow-control message can identify the flow-control operation.

In some embodiments, the exemplary methods and/or procedures can also include sending the flow-control message to a further upstream node in the IAB network. The further upstream node can be upstream in relation to the upstream node. In some embodiments, the exemplary methods and/or procedures can also include determining that the congestion has been relieved in at least a portion of the particular downstream nodes. In such embodiments, the exemplary methods and/or procedures can also include sending a subsequent flow-control message, to the upstream node, identifying at least one node for which a subsequent flow-control operation is requested based on the relieved congestion.

Exemplary embodiments also include further methods and/or procedures for flow control of data transmission from a base station to a plurality of user equipment (UE) via an integrated access backhaul (IAB) network. These exemplary methods and/or procedures can be performed by a second node in the IAB network (e.g., upstream from a first node).

The exemplary methods and/or procedures can include receiving a flow-control message from a downstream node in the IAB network. The flow-control message can identify one or more nodes, in the IAB network, for which a flow-control operation is requested in relation to data transmitted from the second node via the downstream node. In some embodiments, the identified one or more nodes can include one or more downstream nodes in which congestion has been detected. In some embodiments, the flow-control message can identify the one or more nodes based on identifying one or more radio bearers associated with one or more UEs being served by the one or more nodes. In some embodiments, the flow-control message can identify the flow-control operation.

The exemplary methods and/or procedures can also include performing one or more flow-control operations based on the flow-control message. In some embodiments, this can include perform the identified flow-control operation in relation to the identified one or more nodes. The exemplary methods and/or procedures can also include determining whether to send a further flow-control message, concerning the data transmitted from the second node via the downstream node, to an upstream node in the IAB network. In some embodiments, determining whether to send the further flow-control message can be based on at least one of the following factors: data buffer levels at the second node; rate of change in data buffer levels at the second node; the one or more flow-control operation performed; and the elapsed time since the flow-control message was received. In some embodiments, the exemplary methods and/or procedures can also include sending the further flow-control message to the upstream node.

In some embodiments, the exemplary methods and/or procedures can also include receiving a subsequent flow-control message from the downstream node. The subsequent flow-control message can identify at least one node, in the IAB network, for which a subsequent flow-control operation is requested in relation to data transmitted from the second node via the downstream node. In such embodiments, the exemplary methods and/or procedures can also include performing at least one flow-control operation based on the subsequent flow-control message. In some embodiments, the exemplary methods and/or procedures can also include, it was previously determined to send the further flow-control message to the upstream node, sending a subsequent further flow-control message to the upstream node in response to receiving the subsequent flow-control message from the downstream node.

Other exemplary embodiments include IAB nodes configured to perform operations corresponding to any of the exemplary methods and/or procedures described herein. Other exemplary embodiments include non-transitory, computer-readable media storing program instructions that, when executed by processing circuitry of an IAB node, configure the IAB node to perform operations corresponding to any of the exemplary methods and/or procedures described herein.

These and other objects, features, and advantages of the present disclosure will become apparent upon reading the following Detailed Description in view of the drawings briefly described below.

BRIEF DESCRIPTION OF THE DRAWINGS

FIGS. 20-23 are flow diagrams of exemplary methods and/or procedures for transmission and/or reception of user data that can be implemented, for example, in the exemplary communication systems and/or networks illustrated in FIGS. 18-19.

DETAILED DESCRIPTION

Figure 1:
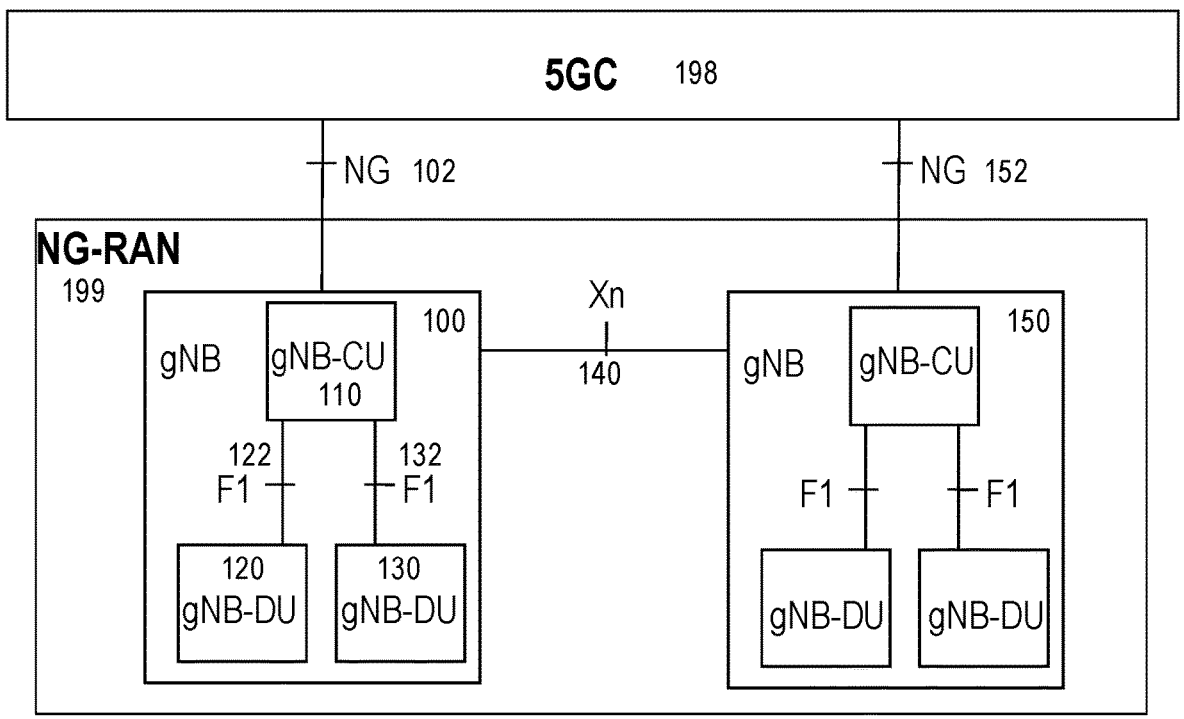
FIG. 1 illustrates a high-level view of the 5G network architecture, including a Next Generation radio access network (NG-RAN) and a 5G core (5GC) network.
Figure 2:
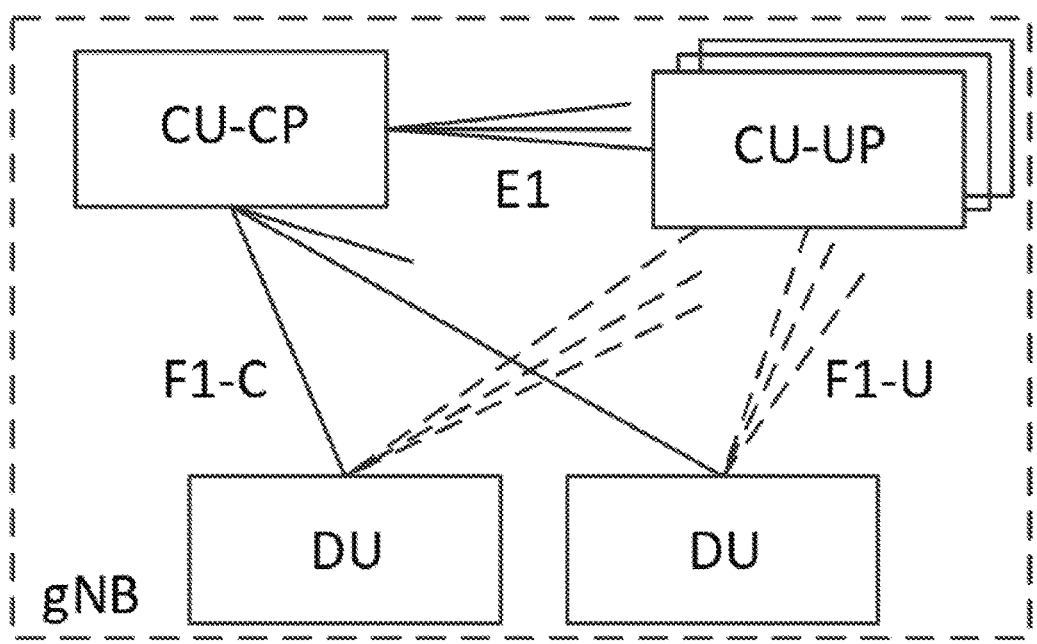
FIG. 2 illustrates interfaces within an NG-RAN node (e.g., gNB) that support control plane (CP) and user plane (UP) functionality.
Figure 3:
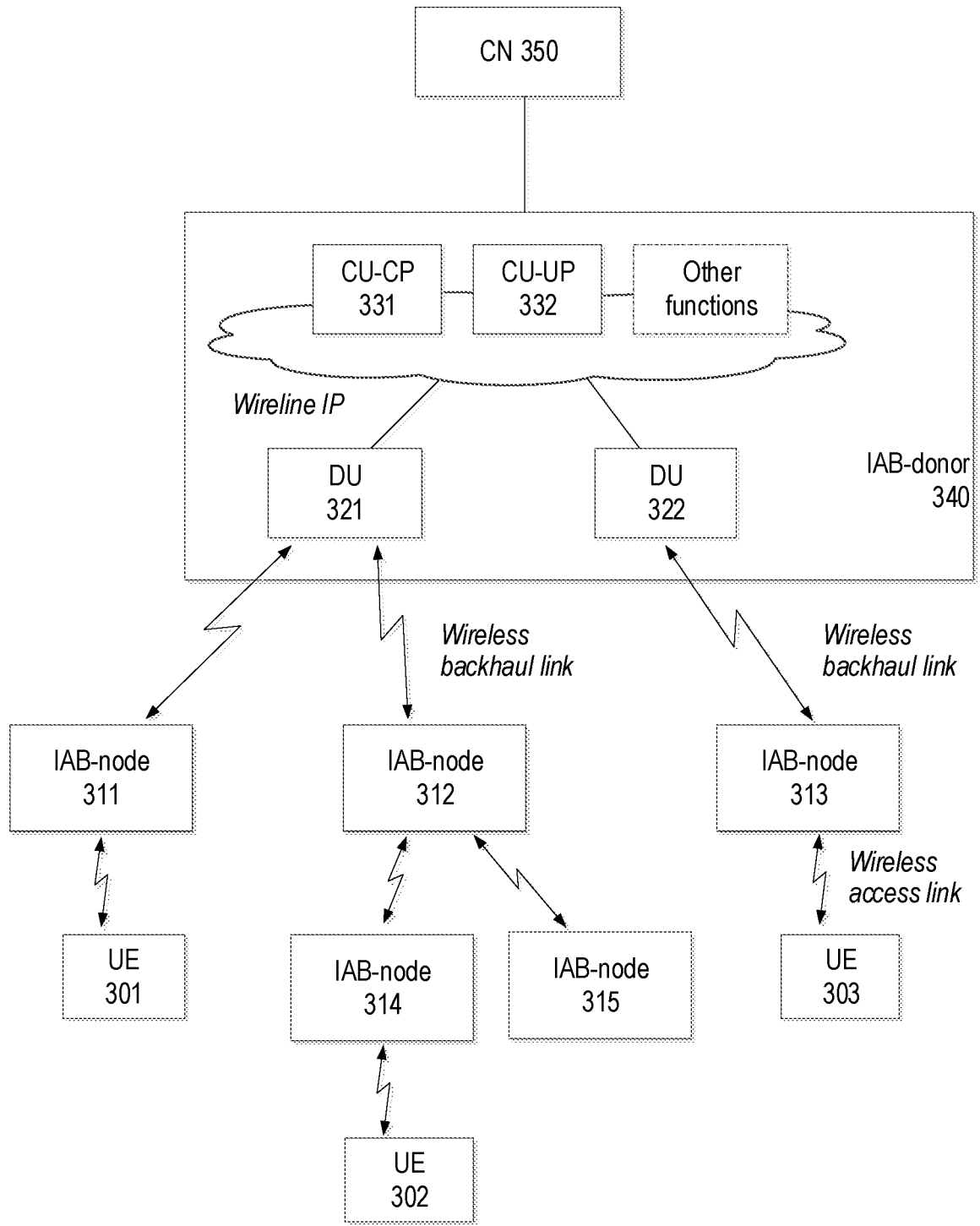
FIG. 3 shows a reference diagram for an integrated access backhaul (IAB) network in standalone mode, as further explained in 3GPP TR 38.874.

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above. Furthermore, the following terms are used throughout the description given below:

- Radio Node: As used herein, a "radio node" can be either a "radio access node" or a "wireless device."
- Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.
- Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.
- Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.
- Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As discussed above, using RLC ARQ hop-by-hop can have several advantages as compared to end-to-end RLC ARQ. At the same time, however, using hop-by-hop RLC ARQ can introduce various problems with packet losses on the PDCP layer above RLC, particularly in relation to certain arrangements of the adaptation layer in the overall protocol stack. These issues are discussed in more detail below.

The F1-U protocol (also referred to as NR User Plane Protocol) is used to convey control information related to the user data flow management of data radio bearers, as defined in 3GPP TS 38.425. The F1-U protocol data is conveyed by GTP-U protocol, specifically by the "RAN Container" GTP-U extension header defined in 3GPP TS 29.281. GTP-U over UDP/IP serves as the transport network layer (TNL) for data streams on the F1 interface. The transport bearer is identified by the GTP-U tunnel endpoint ID (TEID) and the IP address (source TEID, destination TEID, source IP address, destination IP address). The F1-U protocol uses the services of the TNL to allow flow control of user data packets transferred from the node hosting NR PDCP (CU-UP in the case of CU-DU split) to the corresponding node (DU).

The followings services provided by F1-U are defined in 3GPP TS 38.425:

- Provision of NR user plane specific sequence number information for user data transferred from the node hosting NR PDCP to the corresponding node for a specific data radio bearer.
- Information of successful in sequence delivery of NR PDCP PDUs to the UE from the corresponding node for user data associated with a specific data radio bearer.
- Information of NR PDCP PDUs that were not delivered to the UE or the lower layers.
- Information of NR PDCP PDUs transmitted to the lower layers for user data associated with a specific data radio bearer.
- Information of downlink NR PDCP PDUs to be discarded for user data associated with a specific data radio bearer;
- Information of the currently desired buffer size at the corresponding node for transmitting to the UE user data associated with a specific data radio bearer.
- Information of the currently minimum desired buffer size at the corresponding node for transmitting to the UE user data associated with all data radio bearers configured for the UE at the corresponding node;

Information of successful in sequence delivery of NR PDCP PDUs to the UE from the corresponding node for retransmission user data associated with a specific data radio bearer;

Information of NR PDCP PDUs transmitted to the lower layers for retransmission user data associated with a specific data radio bearer.

Information of the specific events at the corresponding node (e.g., radio link outage, radio link resume)

Figures 4, 5:
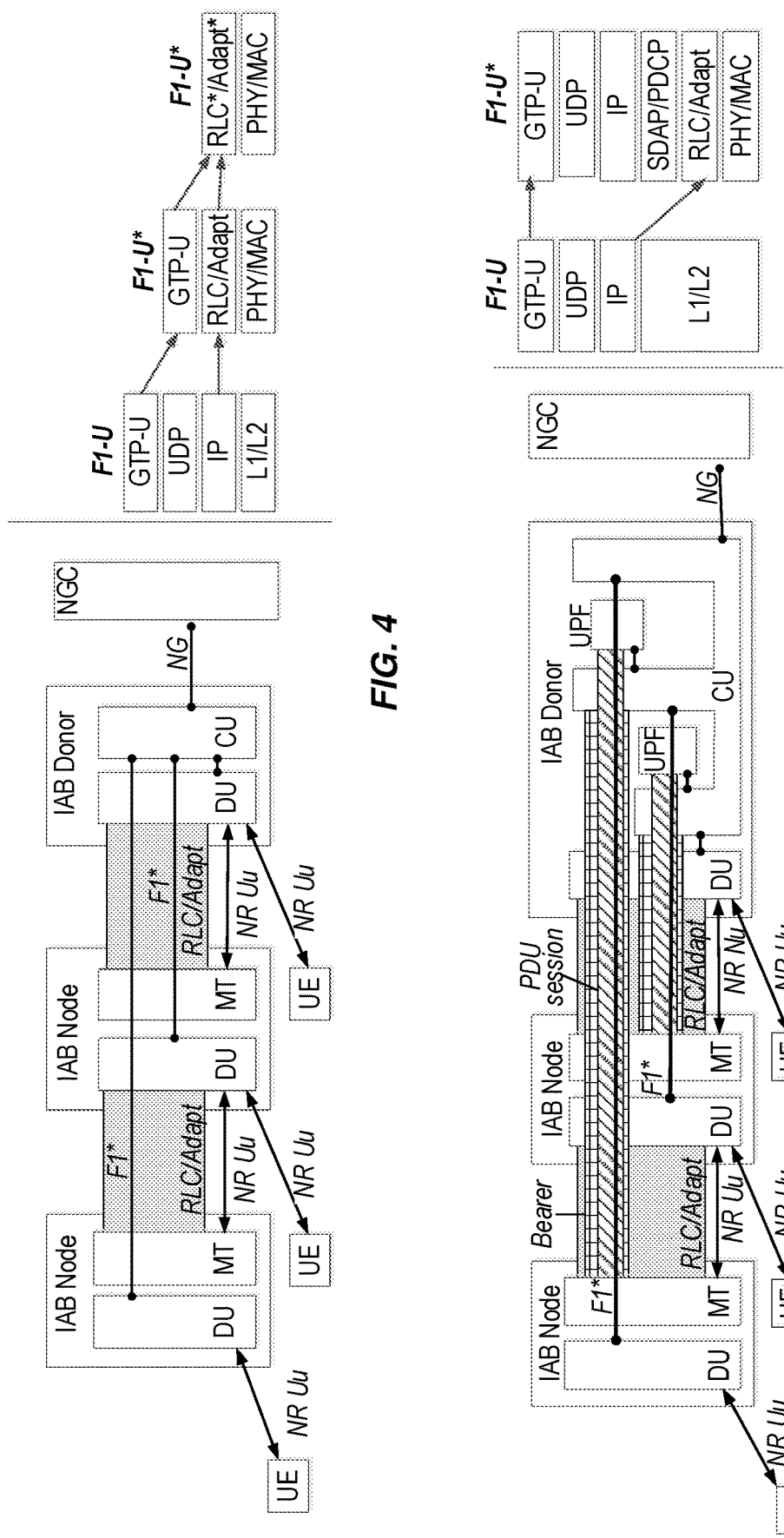
FIGS. 4-5 show block diagrams of two different IAB reference architectures, i.e., architectures "1a" and "1b" as specified in 3GPP TS 38.874.

3GPP TR 38.874 (version 0.2.1) specifies several reference architectures for supporting user plane traffic over IAB nodes, including IAB Donor nodes. FIG. 4 shows a block diagram of an IAB reference architecture "1a" as specified in 3GPP TS 38.874, which leverages the CU/DU split architecture in a two-hop chain of IAB nodes underneath an IAB-donor. In this architecture, each IAB node holds a DU and an MT. Via the MT, the IAB-node connects to an upstream IAB-node or the IAB-donor. Via the DU, the IAB-node establishes RLC-channels to UEs and to MTs of downstream IAB-nodes. For MTs, this RLC-channel may refer to a modified RLC*. Whether an IAB node can connect to more than one upstream IAB-node or IAB-donor is for further study.

The IAB Donor also includes a DU to support UEs and MTs of downstream IAB nodes. The IAB-donor holds a CU for the DUs of all IAB-nodes and for its own DU. It is FFS if different CUs can serve the DUs of the IAB-nodes. Each DU on an IAB-node connects to the CU in the IAB-donor using a modified form of F1, which is referred to as F1*. The user-plane portion of F1* (referred to as "F1*-U") runs over RLC channels on the wireless backhaul between the MT on the serving IAB-node and the DU on the IAB donor. F1*-U transport between MT and DU on the serving IAB-node as well as between DU and CU on the donor is for further study (FFS).

In addition, an adaptation layer is included to hold routing information, thereby enabling hop-by-hop forwarding. In some sense, the adaptation layer replaces the IP functionality of the standard F1-U stack. F1*-U may carry a GTP-U header for the end-to-end association between CU and DU. In a further enhancement, information carried inside the GTP-U header may be included into the adaption layer. Further optimizations to RLC may be considered such as applying ARQ only on the end-to-end connection (i.e., between the donor DU and the IAB node) rather than hop-by-hop.

The right side of FIG. 4 shows two examples of such F1*-U protocol stacks and how they can be adapted from the existing F1-U protocol stack. In this figure, enhancements of RLC are referred to as RLC*. The MT of each IAB-node further sustains NAS connectivity to the NGC, e.g., for authentication of the IAB-node. It further sustains a PDU-session via the NGC, e.g., to provide the IAB-node with connectivity to the OAM. Details of F1*, the adaptation layer, RLC*, hop-by-hop forwarding, and transport of F1-AP are for further study. Protocol translation between F1* and F1 in case the IAB-donor is split is also FFS.

FIG. 5 shows a block diagram of an IAB reference architecture "1b" as specified in 3GPP TS 38.874 (version 0.2.1), which also leverages the CU/DU split architecture in a two-hop chain of IAB nodes underneath an IAB-donor. The IAB-donor holds only one logical CU. In this architecture, each IAB-node and the IAB-donor hold the same functions as in architecture 1a. Also, as in architecture 1a, every backhaul link establishes an RLC-channel, and an adaptation layer is inserted to enable hop-by-hop forwarding of F1*.

In architecture 1b, however, the MT on each IAB-node establishes a PDU-session with a UPF residing on the donor. The MT's PDU-session carries F1* for the collocated DU. In this manner, the PDU-session provides a point-to-point link between CU and DU. On intermediate hops, the PDCP-PDUs of F1* are forwarded via an adaptation layer in the same manner as described for architecture 1a. The right side of FIG. 5 shows an example of the F1*-U protocol stack.

Referring again to architecture 1a shown in FIG. 4, user plane (UP) and control-plane (CP, e.g., RRC) traffic can be protected via PDCP over the wireless backhaul. A mechanism is also needed for protecting F1-AP traffic over the wireless backhaul. Four alternatives are shown in FIGS. 6-9 below.

Figure 6A:
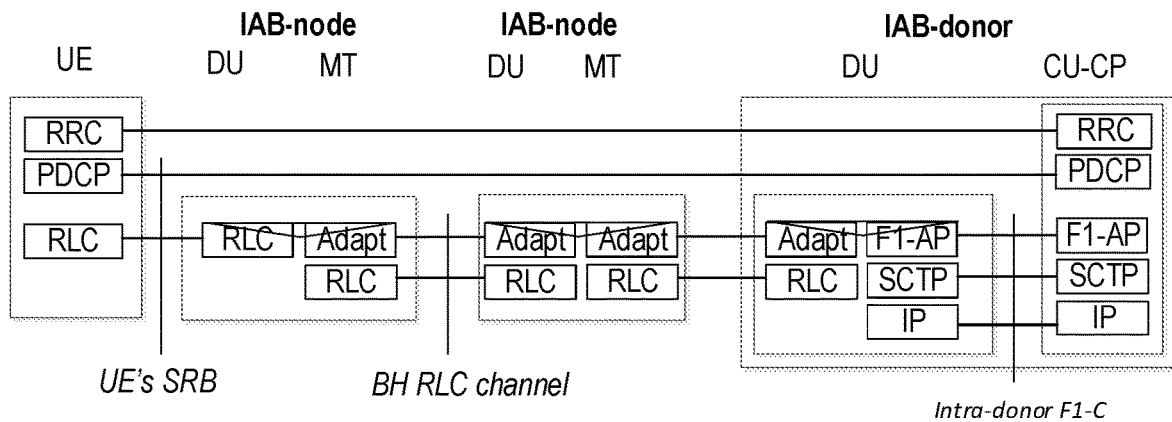
FIGS. 6A-C show exemplary user equipment (UE) radio resource control (RRC), mobile terminal (MT) RRC, and distributed unit (DU) F1-AP protocol stacks, respectively, for a first alternative for architecture "1a" (also referred to as "alternative 1").
Figure 6B:
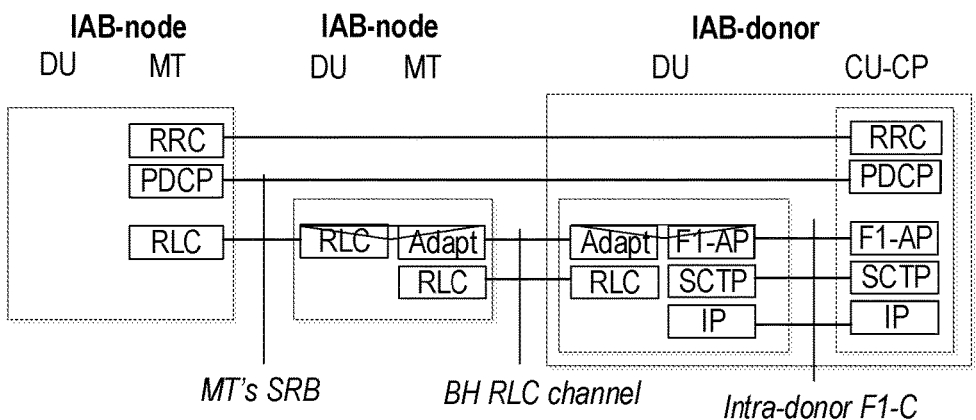
Figure 6C:
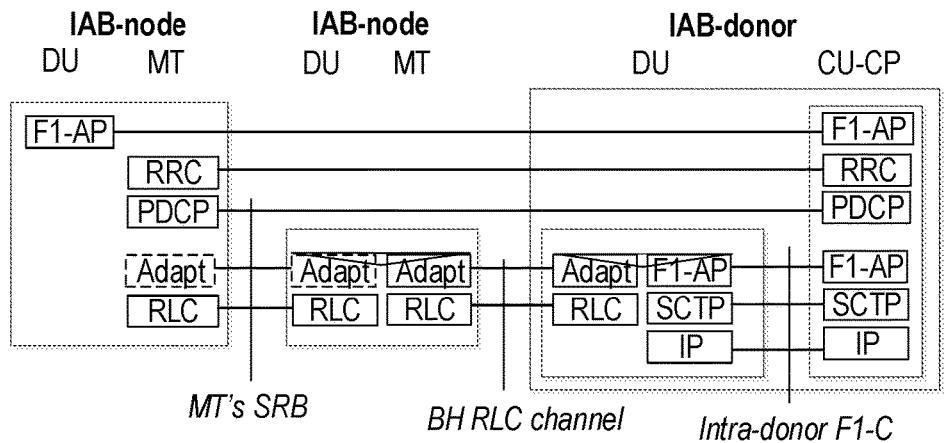

FIGS. 6A-C show exemplary UE RRC, MT RRC, and DU F1-AP protocol stacks for a first alternative for architecture 1a, also referred to as "alternative 1". In this alternative, the adaptation layer is placed on top of RLC, and RRC connections for UE RRC and MT RRC are carried over a signalling radio bearer (SRB). On the UE's or MT's access link, the SRB uses an RLC-channel; whether the RLC channel has an adaptation layer is for further study.

On the wireless backhaul links, the SRB's PDCP layer is carried over RLC-channels with adaptation layer. The adaptation layer placement in the RLC channel is the same for CP as for UP. The information carried on the adaptation layer may be different for SRB than for data radio bearer (DRB). The DU's F1-AP is encapsulated in RRC of the collocated MT. F1-AP is therefore protected by the PDCP of the underlying SRB. Within the IAB-donor, the baseline is to use native F1-C stack.

Figure 7A:
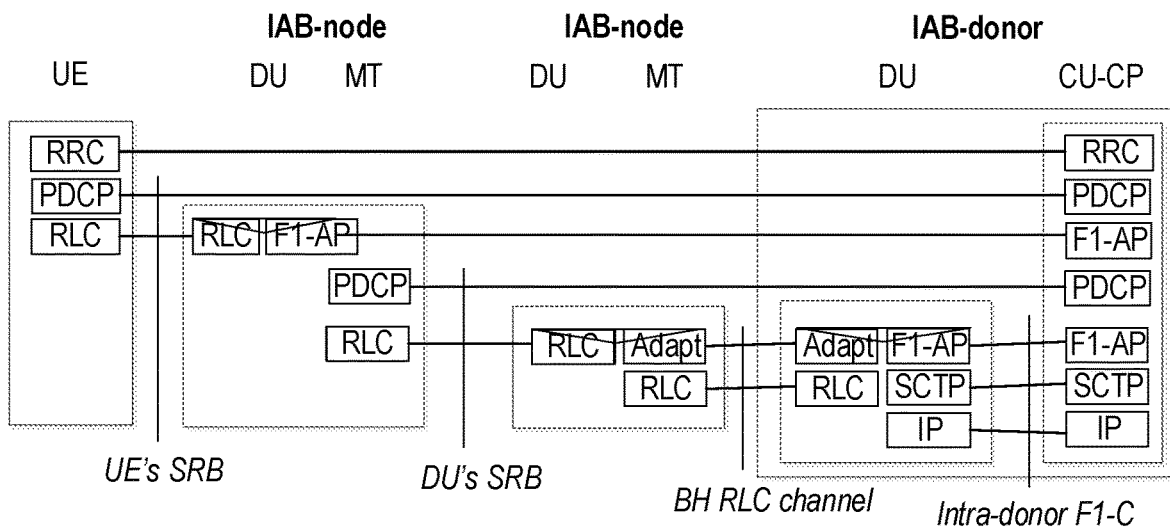
FIGS. 7A-C show exemplary UE RRC, MT RRC, and DU F1-AP protocol stacks, respectively, for a second alternative for architecture "1a" (also referred to as "alternative 2").
Figure 7B:
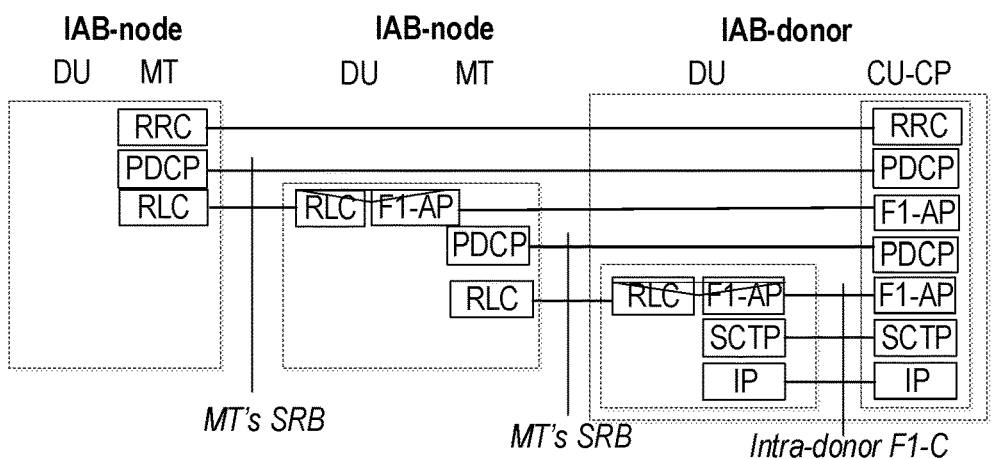
Figure 7C:
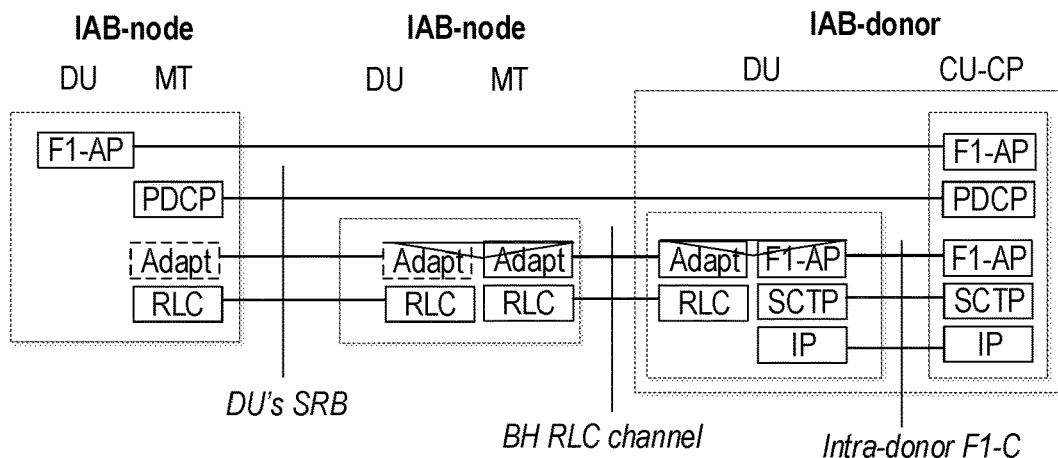

FIGS. 7A-C show exemplary UE RRC, MT RRC, and DU F1-AP protocol stacks for a second alternative for architecture 1a, also referred to as "alternative 2" Similar to alternative 1, RRC connections for UE RRC and MT RRC are carried over a signalling radio bearer (SRB), and the SRB uses an RLC-channel on the UE's or MT's access link.

In contrast, on the wireless backhaul links, the SRB's PDCP layer is encapsulated into F1-AP. The DU's F1-AP is carried over an SRB of the collocated MT. F1-AP is protected by this SRB's PDCP. On the wireless backhaul links, the PDCP of the F1-AP's SRB is carried over RLC-channels with adaptation layer. The adaptation layer placement in the RLC channel is the same for CP as for UP. The information carried on the adaptation layer may be different for SRB than for DRB. Within the IAB-donor, the baseline is to use native F1-C stack.

Figure 8A:
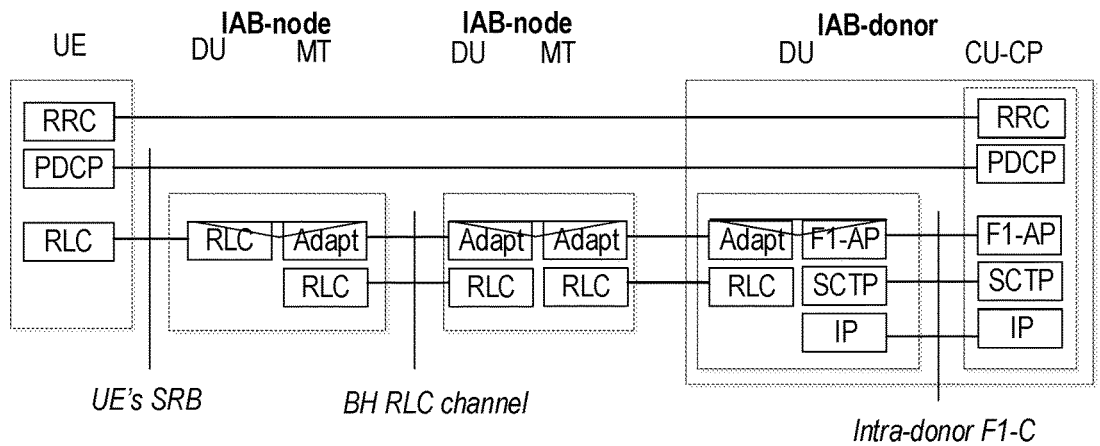
FIGS. 8A-C show exemplary UE RRC, MT RRC, and DU F1-AP protocol stacks, respectively, for a third alternative for architecture "1a" (also referred to as "alternative 3").
Figure 8B:
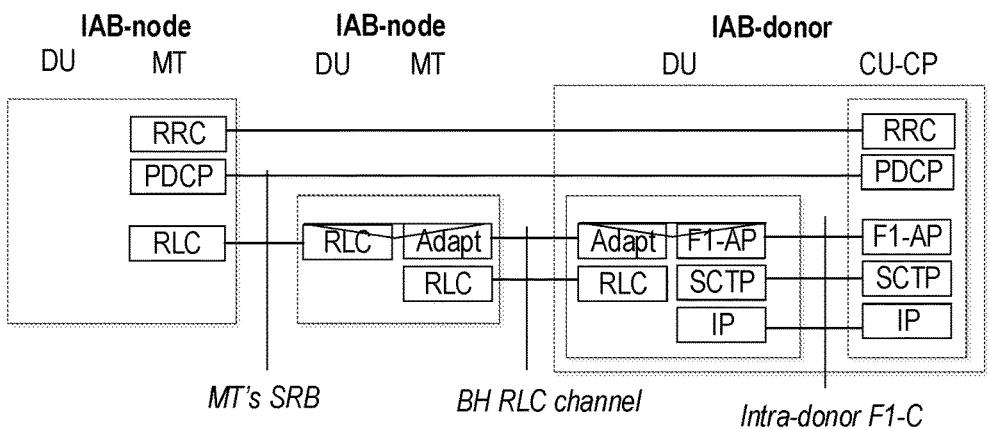
Figure 8C:
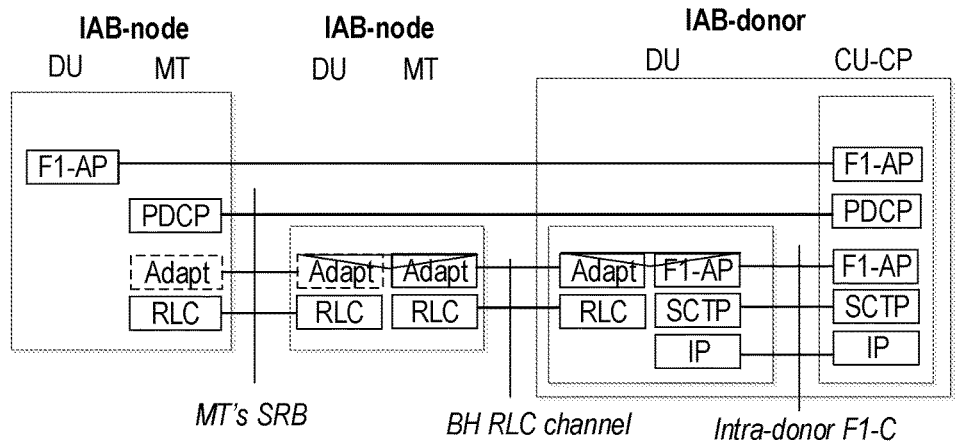

FIGS. 8A-C show exemplary UE RRC, MT RRC, and DU F1-AP protocol stacks for a third alternative for architecture 1a, also referred to as "alternative 3". In this alternative, the adaptation layer is placed on top of RLC, and RRC connections for UE and MT are carried over a signalling radio bearer (SRB). On the UE's or MT's access link, the SRB uses an RLC-channel; whether the RLC channel has an adaptation layer is for further study.

On the wireless backhaul links, the SRB's PDCP layer is carried over RLC-channels with adaptation layer. The adaptation layer placement in the RLC channel is the same for CP as for UP. The information carried on the adaptation layer may be different for SRB than for data radio bearer (DRB). The DU's F1-AP is also carried over an SRB of the collocated MT. F1-AP is therefore protected by the PDCP of this SRB. On the wireless backhaul links, the PDCP of the this SRB is also carried over RLC-channels with adaptation layer. Within the IAB-donor, the baseline is to use native F1-C stack.

Figure 9A:
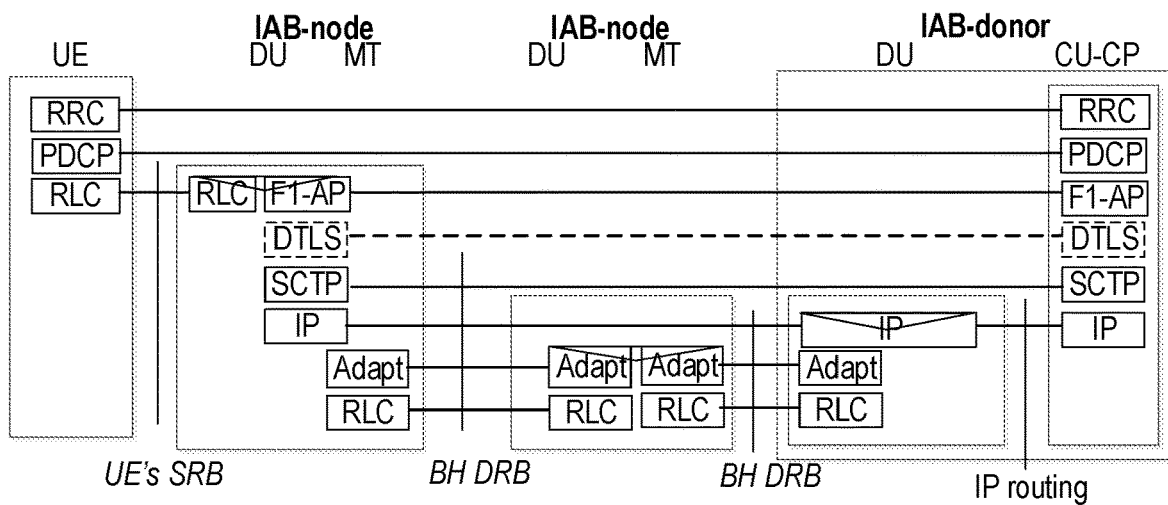
FIGS. 9A-C show exemplary UE RRC, MT RRC, and DU F1-AP protocol stacks, respectively, for a fourth alternative for architecture "1a" (also referred to as "alternative 4").
Figure 9B:
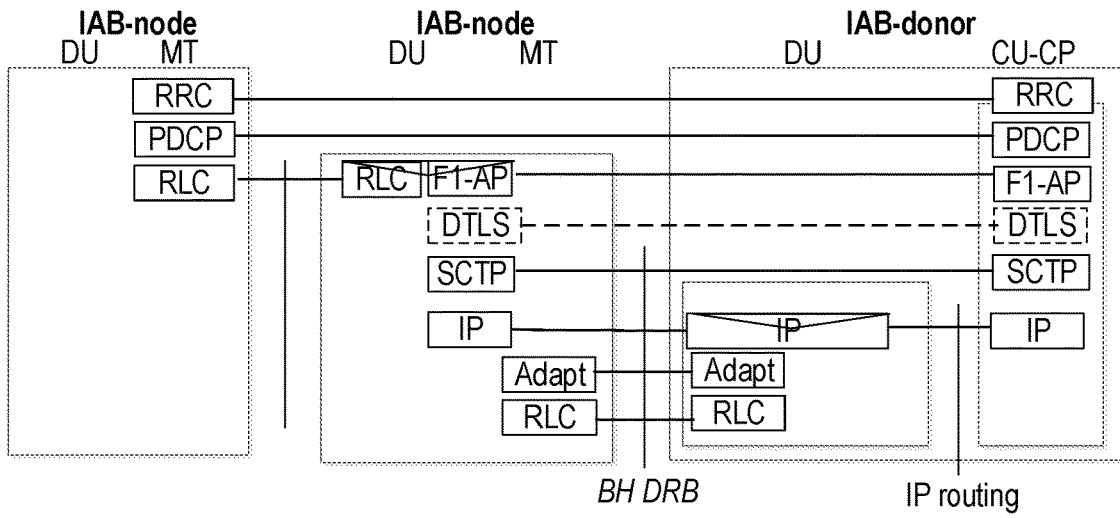
Figure 9C:
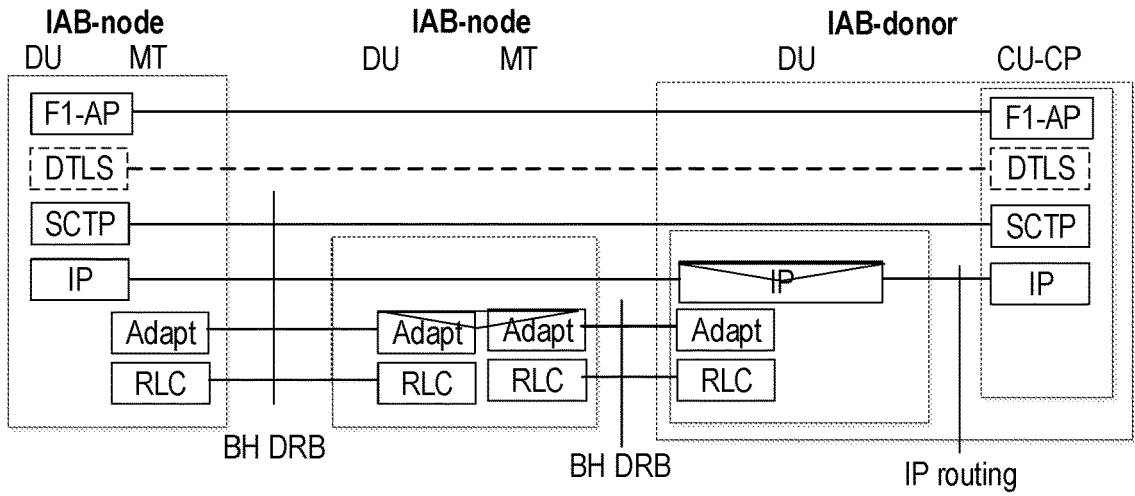

FIGS. 9A-C show exemplary UE RRC, MT RRC, and DU F1-AP protocol stacks for a fourth alternative for architecture 1a, also referred to as "alternative 4". In this alternative, the adaptation layer is placed on top of RLC, and all F1-AP signalling is carried over SCTP/IP to the target node. The IAB-donor maps DL packets based on target node IP to adaptation layer used on backhaul DRB. Separate backhaul DRBs can be used to carry F1-AP signalling apart from F1-U related content. For example, mapping to backhaul DRBs can be based on target node IP address and IP layer Diffsery Code Points (DSCP) supported over F1 as specified in 3GPP TS 38.474.

In alternative 4, a DU can also forward other IP traffic to the IAB node (e.g., OAM interfaces). The IAB node terminates the same interfaces as a normal DU except that the L2/L1 protocols are replaced by adaptation/RLC/MAC/PHY-layer protocols. F1-AP and other signalling are protected using NDS (e.g., IPSec, DTLS over SCTP) operating in the conventional way between DU and CU. For example, SA3 has recently adopted the usage of DTLS over SCTP (as specified in IETF RFC6083) for protecting F1-AP.

Figure 10A:
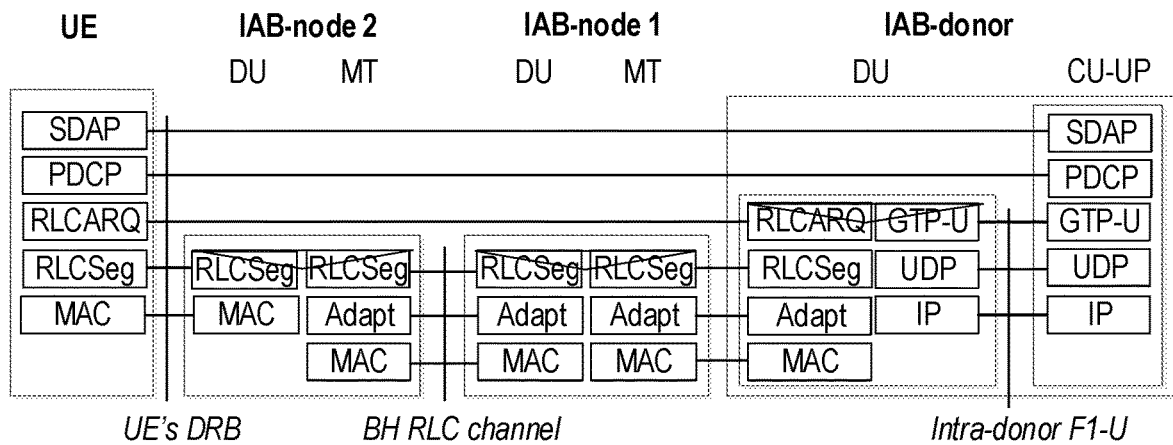
FIGS. 10A-E illustrate exemplary user-plane protocol stack arrangements for architecture "1a," with each arrangement corresponding to a different placement of an adaptation layer.
Figure 10B:
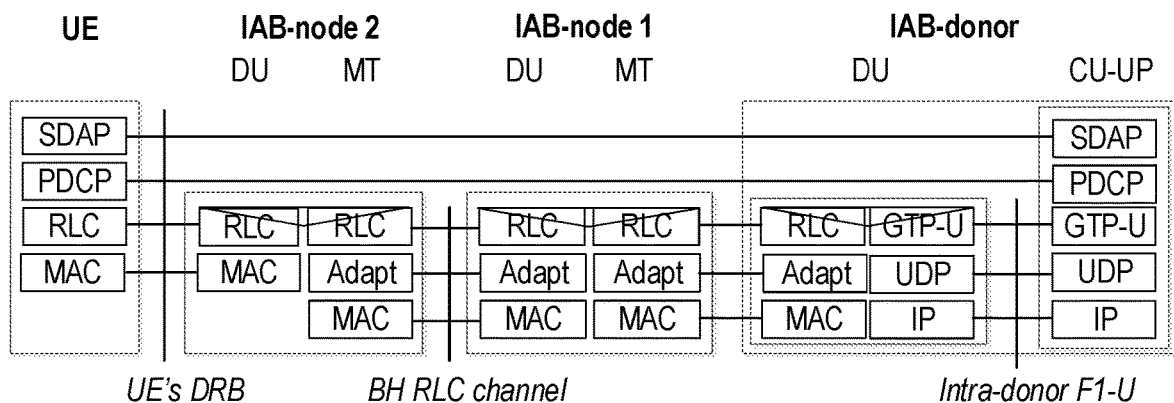
Figure 10C:
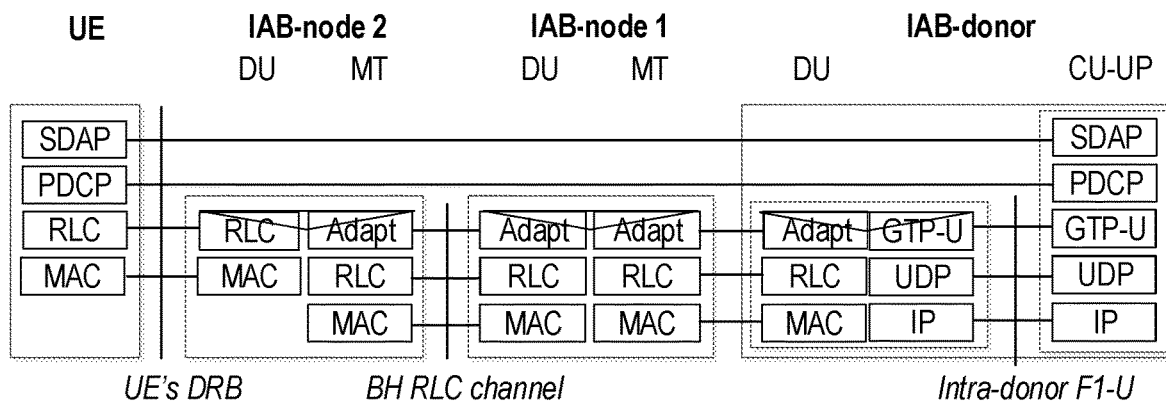
Figure 10D:
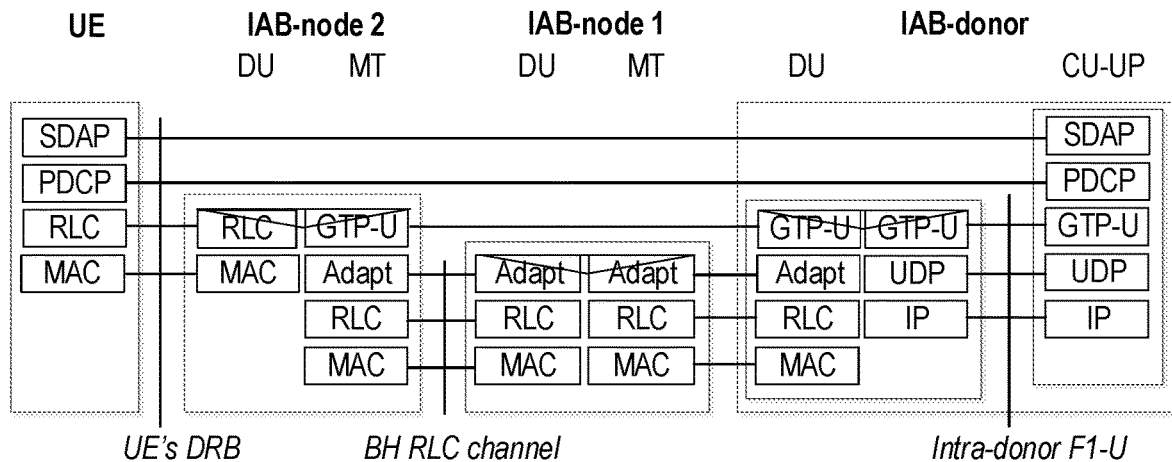
Figure 10E:
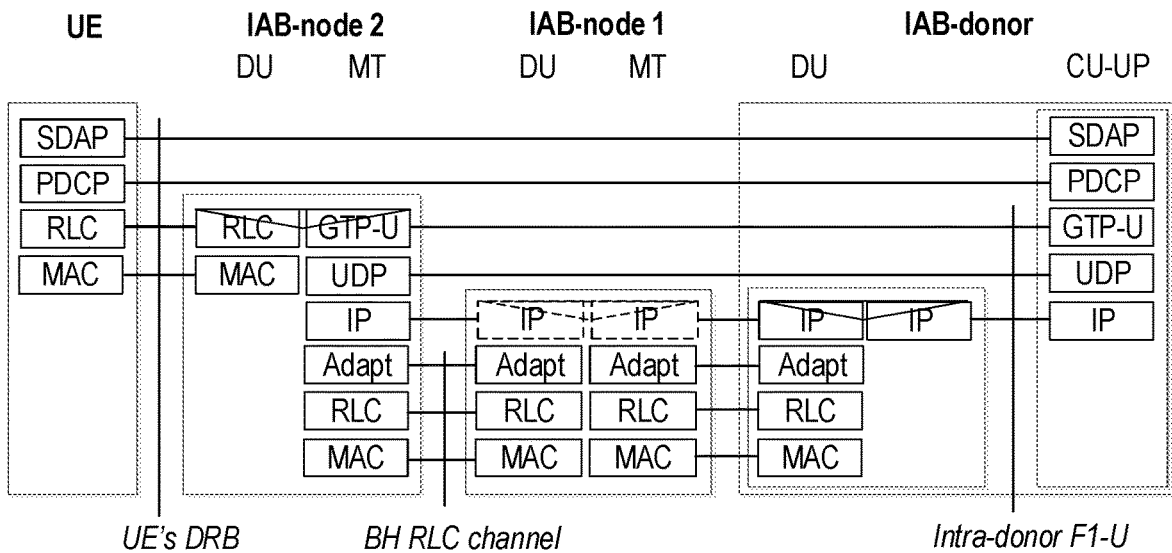
Figure 11:
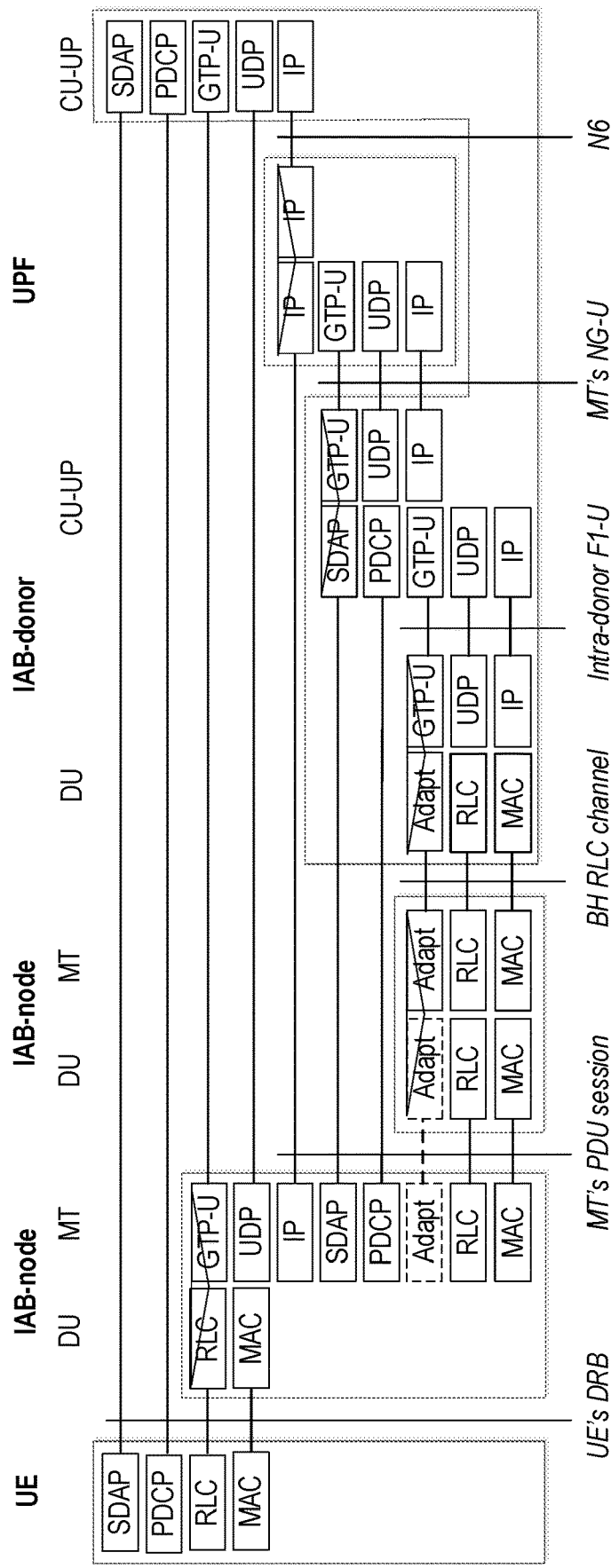
FIG. 11 illustrates an exemplary user-plane protocol stack arrangement for architecture "1b."

In addition to the CP considerations discussed above, there are various UP considerations for architectures 1a and 1b. These include placement of the adaptation layer, functions supported by the adaptation layer, support of multi-hop RLC, and impacts on scheduler and QoS. FIGS. 10A-E illustrate exemplary user-plane protocol stack arrangements for architecture 1a, with each arrangement corresponding to a different placement of the adaptation layer. Furthermore, each arrangement shows protocol stacks for UE, the UE's access IAB node, and intermediate IAB node, and the IAB donor DU/CU. FIG. 11 illustrates an exemplary user-plane protocol stack arrangement for architecture 1b, also including protocol stacks for UE, the UE's access IAB node, and intermediate IAB node, and the IAB donor DU/CU.

The UE establishes RLC channels to the UE's access IAB node DU in compliance with TS 38.300. Each of these RLC-channels can be extended between the UE's access DU and the IAB donor via a potentially modified form of F1-U, referred to as F1*-U. The information embedded in F1*-U is carried over RLC-channels across the backhaul links Transport of F1*-U over the wireless backhaul is enabled by the adaptation layer, which can be integrated with the RLC channel. Even though it is used with RLC for IAB-node backhaul, it is FFS whether the adaptation layer is also included in IAB-node access links (i.e., with UEs accessing the IAB node). This is illustrated by the dashed "Adapt" boxes in FIG. 11.

Within the IAB-donor (referred to as fronthaul), the baseline is to use native F1-U stack. The IAB-donor DU relays between F1-U on the fronthaul and F1*-U on the wireless backhaul.

In architecture 1a, information carried on the adaptation layer supports the following functions:
  Identification of the UE-bearer for the PDU,
  Routing across the wireless backhaul topology,
  QoS-enforcement by the scheduler on DL and UL on the wireless backhaul link,
  Mapping of UE user-plane PDUs to backhaul RLC channels,
  Others.
Similarly, in architecture 1b, information carried on the adaptation layer supports the following functions:
  Routing across the wireless backhaul topology,
  QoS-enforcement by the scheduler on DL and UL on the wireless backhaul link,
  Mapping of UE user-plane PDUs to backhaul RLC channels
  Others.

Information to be carried on the adaptation layer can include, but is not limited to:
  UE-bearer-specific Id;
  UE-specific Id;
  Route Id, IAB-node or IAB-donor address; and
  QoS information.

IAB nodes can use identifiers carried via the adaptation layer to ensure required QoS treatment and to decide which hop any given packet should be sent to. While study will be done within 3GPP to identify, which of the information on the adaptation layer is processed to support the above functions on each on-path IAB-node (hop-by-hop), and/or on the UE's access-IAB-node and the IAB-donor (end-to-end), a brief overview is provided below regarding how the above information might be used to this end. More particularly, the UE-bearer-specific Id may be used by the IAB-node and the IAB-donor to identify the PDU's UE-bearer. The UE's access IAB node would then map adaptation layer information (e.g., UE-specific ID, UE-bearer specific ID) into the corresponding C-RNTI and LCID. The IAB Donor DU may also need to map adaptation layer information into the F1-U GTP-U TEID used between Donor DU and Donor CU. UE-bearer-specific Id, UE-specific Id, Route Id, or IAB-node/IAB-donor address may be used (in combination or individually) to route the PDU across the wireless backhaul topology. UE-bearer-specific Id, UE-specific Id, UE's access node IAB ID, or QoS information may be used (in combination or individually) on each hop to identify the PDU's QoS treatment. The PDU's QoS treatment may also be based on the LCID.

Various options are available for placement of adaptation layer into L2 stack. For example, the adaptation layer can be integrated with, or placed above, the MAC layer but below the RLC layer. FIGS. 10A-B show two options for placement of the adaptation layer above MAC and below RLC. Alternately, the adaptation layer can be placed above RLC. Several examples of this alternative are shown in FIG. 10C-E and FIG. 11.

For one-to-one mapping of UE-bearers to backhaul RLC-channel, the adaptation layer should be integrated with the MAC layer or placed above the MAC layer. A separate RLC-entity in each IAB node can be provided for each of these backhaul RLC-channels. Arriving PDUs can be mapped to the corresponding RLC-entity based on the UE-bearer information carried by the adaptation layer. When UE-bearers are aggregated to backhaul RLC-channels (e.g., based on QoS-profile), the adaptation layer can be placed above the RLC layer. For both of these options, when UE bearers are aggregated to logical channels, the logical channel can be associated to a QoS profile. The number of QoS-profiles supported is limited by the LCID-space.

The adaptation layer itself may consist of sublayers. It is conceivable, for example, that the GTP-U header becomes a part of the adaptation layer. It is also possible that the GTP-U header is carried on top of the adaptation layer to carry end-to-end association between the IAB-node DU and the CU (example is shown in FIG. 9d).

Alternatively, an IP header may be part of the adaptation layer or carried on top of the adaptation layer. One example is shown in FIG. 5e. In this example, the IAB-donor DU holds an IP routing function to extend the IP-routing plane of the fronthaul to the IP-layer carried by adapt on the wireless backhaul. This allows native F1-U to be established end-to-end, i.e., between IAB-node DUs and IAB-donor CU-UP. The scenario implies that each IAB-node holds an IP-address, which is routable from the fronthaul via the IAB-donor DU. The IAB-nodes' IP addresses may further be used for routing on the wireless backhaul.

Note that the IP-layer on top of the adaptation layer does not represent a Protocol Data Unit (PDU) session. The MT's first hop router on this IP-layer therefore does not have to hold a UPF.

The specific design of the adaption header is not specified, but various alternatives are possible. Various other aspects of the placement of the adaptation layer can be considered. For example, an above-RLC adaptation layer can only support hop-by-hop ARQ. The above-MAC adaptation layer can support both hop-by-hop and end-to-end ARQ. On the other hand, both adaptation layer placements can support aggregated routing (e.g., by inserting an IAB-node address into the adaptation header) and both adaptation layer placements can support per-UE-bearer QoS treatment. In order for each UE bearer to receive individual QoS support when their number exceeds the size of the LCI space, the LCID space might be extended, e.g., by changeds to the MAC sub-header or by dedicated information placed in the adaptation layer header. It is to be determined whether eight groups for uplink BSR reporting is sufficient, or whether the scheduling node has to possess better knowledge of which DRB has uplink data.

It is possible that the UE-specific ID, if used, will be a completely new identifier; alternatively, one of the existing identifiers can be resued. The identifiers included in the adaptation layer header may vary, depending on the adaptation layer placement. For above-RLC adaptation layer, the LCID space has to be enhanced since each UE-bearer is mapped to an independent logical channel. For above-MAC adaptation layer, UE-bearer-related info has to be carried on the adaptation header.

In addition, both adaptation layer placements can support aggregated QoS handling, in the following example network configurations: (a) For above-RLC adaptation layer placement, UE bearers with the same QoS profile could be aggregated to one backhaul RLC channel for this purpose; (b) for above-MAC or integrated-with-MAC adaptation layer, UE bearers with the same QoS profile could to treated with the same priority by the scheduler. In addition, for both adaptation layer placements, aggregation of routing and QoS handling allows proactive configuration of intermediate on-path IAB-nodes, i.e., configuration is independent of UE-bearer establishment/release. Likewise, for both adaptation layer placements, RLC ARQ can be pre-processed on TX side.

For RLC AM, ARQ can be conducted hop-by-hop along access and backhaul links (FIGS. 10C-E and 11). It is also possible to support ARQ end-to-end between UE and IAB-donor (FIG. 10A-B). Since RLC segmentation is a just-in-time process, it is always conducted in a hop-by-hop manner. For end-to-end multi-hop RLC ARQ, the adaptation layer should be integrated with MAC layer or placed above MAC layer. In contrast, there is dependence between the adaptation and MAC layers for multi-hop RLC ARQ conducted hop-by-hop. Table 1 below provides a summary comparison between end-to-end and hop-by-hop RLC ARQ.

TABLE 1

| Metric | Hop-by-hop RLC ARQ | End-to-end RLC ARQ |
| --- | --- | --- |
| Forwarding latency | Potentially higher as packets have to pass through RLC-state machine on each hop. | Potentially lower as packets do not go through the RLC state machine on intermediate IAB-nodes. |
| Latency due to retransmission | Independent of number of hops | Increases with number of hops |
| Capacity | Packet loss requires retransmission only on one link. Avoids redundant retransmission of packets over links where the packet has already been successfully transmitted. | Packet loss may imply retransmission on multiple links, including those where the packet was already successfully transmitted. |
| Hop count limitation due to RLC parameters | Hop count is not affected by max window size. | Hop count may be limited by the end-to-end RLC latency due to max window size. |
| Hop count limitation due to PCDP parameters | Hop count may be limited by increasing disorder of PDCP PDUs over sequential RLC ARQ hops. This may increase probability to exceed max PDCP window size. | Hop count does not impact disorder of PDCP PDUs due to RLC ARQ. |
| Processing and memory impacton intermediate IAB-nodes | Larger since processing and memory can be required on intermediate IAB-nodes. | Smaller since intermediate path-nodes do not need ARQ state machine and flow window. |
| RLC specification impact | No stage-3 impact expected | Potential stage-3 impact |
| Operational impact for IAB-node to IAB-donor upgrades | IAB-nodes and IAB-donors use the same hop-by-hop RLC ARQ. As a result, this functionality is completely unaffected by the upgrade of IAB-node to IAB-donor at availability of fiber, potentially reducing the effort required to confirm proper operation. | End-to-end RLC ARQ results in a greater architectural difference between IAB nodes vs. IAB donor nodes. As a result, additional effort can be required to complete an upgrade of an IAB node to an IAB donor upon availability of fiber. |

TABLE 1-continued

| Metric | Hop-by-hop RLC ARQ | End-to-end RLC ARQ |
| --- | --- | --- |
| Configuration complexity | RLC timers are not dependent on hop-count. | RLC timers become hop-count dependent. |

The purpose of the Downlink Data Delivery Status procedure is to provide feedback from the corresponding node to the node hosting the NR PDCP entity to allow the node hosting the NR PDCP entity to control the downlink user data flow via the corresponding node for the respective data radio bearer. The corresponding node may also transfer uplink user data for the concerned data radio bearer to the node hosting the NR PDCP entity together with a DL DATA DELIVERY STATUS frame within the same GTP-U PDU.

The Downlink Data Delivery Status (DDDS) procedure is also used to provide feedback from the corresponding node to the node hosting the NR PDCP entity to allow the node hosting the NR PDCP entity to control the delivery of DL control data to the corresponding node. When the corresponding node decides to trigger the Feedback for Downlink Data Delivery procedure it shall report:
  a) in case of RLC AM, the highest NR PDCP PDU sequence number successfully delivered in sequence to the UE among those NR PDCP PDUs received from the node hosting the NR PDCP entity i.e., excludes those retransmission NR PDCP PDUs;
  b) the desired buffer size in bytes for the concerned data radio bearer;
  c) optionally, the desired data rate in bytes associated with a specific data radio bearer configured for the UE;
  d) the NR-U packets that were declared as being "lost" by the corresponding node and have not yet been reported to the node hosting the NR PDCP entity within the DL DATA DELIVERY STATUS frame;
  e) if retransmission NR PDCP PDUs have been delivered, the highest NR PDCP PDU sequence number successfully delivered in sequence to the UE among those retransmission NR PDCP PDUs received from the node hosting the NR PDCP entity;
  f) if retransmission NR PDCP PDUs have been transmitted, the highest NR PDCP PDU sequence number transmitted to the lower layers among those retransmission NR PDCP PDUs received from the node hosting the NR PDCP entity;
  g) the highest NR PDCP PDU sequence number transmitted to the lower layers among those NR PDCP PDUs received from the node hosting the NR PDCP entity i.e., excludes those retransmission NR PDCP PDUs.

Note that if a deployment has decided not to use the Transfer of Downlink User Data procedure, items d), e) and f) above are not applicable.

As soon as the corresponding node detects the successful RACH access by the UE for the corresponding data bearer(s), the corresponding node shall send initial DL DATA DELIVERY STATUS frame to the node(s) hosting the NR PDCP entity(ies). The node hosting NR PDCP entity may start sending DL data before receiving the initial DL DATA DELIVERY STATUS frame. In case the DL DATA DELIVERY STATUS frame is sent before any NR PDCP PDU is transferred to lower layers, the information on the highest NR PDCP PDU sequence number successfully delivered in sequence to the UE and the highest NR PDCP PDU sequence number transmitted to the lower layers may not be provided.

The DL DATA DELIVERY STATUS frame shall also include a final frame indication signalling whether the frame is the last DL status report received in the course of releasing a bearer from the corresponding node. Namely, the final frame indication is signalled in cases where the corresponding node knows that the bearer will be released before the DL status report is signalled. When receiving such indication, if applicable, the node hosting the NR PDCP entity considers that no more UL or DL data is expected to be transmitted between the corresponding node and the UE.

The DL DATA DELIVERY STATUS frame may also include an indication of detected radio link outage or radio link resume. When receiving an indication of UL or DL radio link outage detection, the node hosting the NR PDCP entity considers that traffic delivery over DRBs configured for the UE is unavailable at the corresponding node for UL or DL, depending on the indicated outage. When receiving an indication of UL or DL radio link resume detection, the node hosting the NR PDCP entity considers that traffic delivery over DRBs configured for the UE is available at the corresponding node in UL or in DL, depending on the indicated resume.

When receiving the DL DATA DELIVERY STATUS frame, the node hosting the NR PDCP entity:
  Regards the desired buffer size under item b) above and the data rate under item c) above as the amount of data to be sent from the hosting node:
    If the value of the desired buffer size is 0, the hosting node shall stop sending any data per bearer.
    If the value of the desired buffer size in b) above is greater than 0, the hosting node may send up to this amount of data per bearer beyond the "Highest Delivered NR PDCP SN" for RLC AM, or the hosting node may send up to this amount of data per bearer beyond the "Highest Transmitted NR PDCP SN" for RLM UM.
    The value of the desired data rate in c) above is the amount of data desired to be received in a specific amount of time. The amount of time is 1 sec.
    The information of the buffer size in b) above and of the data rate in c) above is valid until the next DL DATA DELIVERY STATUS frame is transferred.
  Is allowed to remove the buffered NR PDCP PDUs according to the feedback of transmitted and/or successfully delivered NR PDCP PDUs; and
  Decides upon the actions necessary to take for NR PDCP PDUs reported other than transmitted and/or successfully delivered.

In case of RLC AM, after the highest NR PDCP PDU sequence number successfully delivered in sequence is reported to the node hosting the NR PDCP entity, the corresponding node removes the respective NR PDCP PDUs. For RLC UM, the corresponding node may remove the respective NR PDCP PDUs after transmitting to lower layers.

Basically, F1-U provides the flow control mechanism so that the node where the PDCP is terminated (CU or CU-UP in the case where there is a CU-CP/CU-UP split) will not keep overloading the DU by sending it too much data if data was not being delivered fast enough over the UE-DU air interface (e.g., due to bad radio conditions).

An important consequence of not using GTP-U for F1-U is the lack of flow control mechanism for user data packets. In the IAB UP architecture alternatives that do not employ full F1-U protocol stack (e.g., FIGS. 10A-C), the CU-UP is only aware of how much traffic goes through the first wireless backhaul hop (through the flow control of the F1-U between the CU-UP and donor DU), while it is completely unaware of the status of the UP data flow on subsequent wireless backhaul links. If the first wireless backhaul link (between donor DU and IAB node 1) is in a good condition, regardless of the radio/buffering conditions on subsequent links/nodes, the CU-UP will keep feeding the donor DU with traffic. In the two hop IAB system depicted in FIG. 10, if the link between IAB node 1 and IAB node 2 experiences poor channel conditions, this may lead to buffer overflow on IAB1, causing data loss.

As discussed above, the adaptation layer for IAB can be either below or above RLC, and RLC ARQ can be performed hop-by-hop or end-to-end (i.e., between the donor DU and the IAB node). Performing the RLC ARQ hop-by-hop have several advantages as compared to end-to-end ARQ, as summarized by Table 1 above.

Also as discussed above, using F1-U end-to-end between the IAB node and the IAB donor provides a flow control mechanism that can be used to control congestion in the network. This end-to-end flow control mechanism has at least two drawbacks. These drawbacks are explained below in relation to FIG. 12, which illustrates an exemplary multi-hop arrangement in an IAB network.

Figure 12:
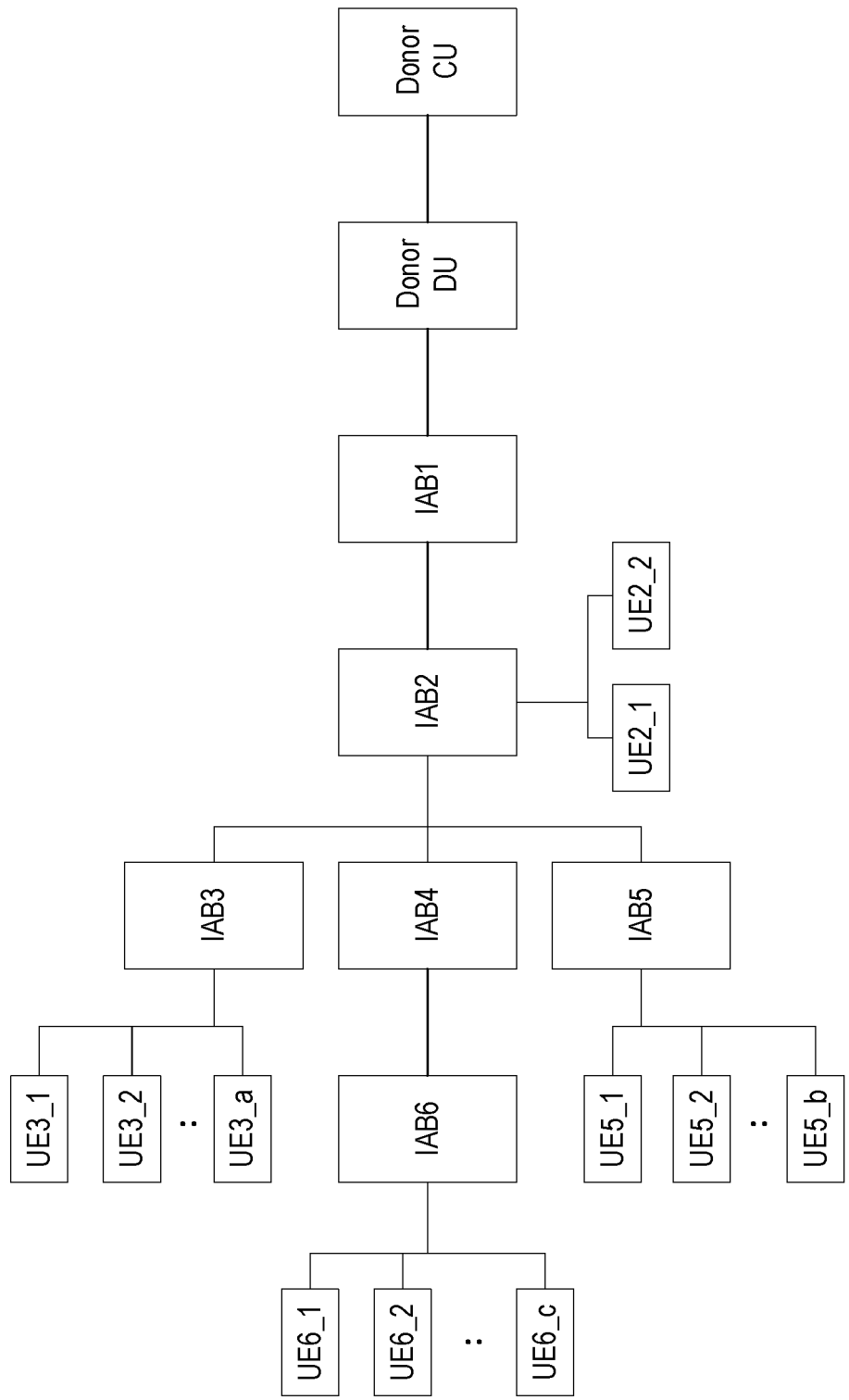
FIG. 12 illustrates an exemplary multi-hop arrangement in an IAB network, according to various exemplary embodiments of the present disclosure.

First, F1-U flow control (and the associated downlink delivery status report that is used to facilitate that) sends information to the CU only about bearers associated with UEs that are being served by the DU sending the report. In FIG. 12, IAB2 is serving two UEs and also has three direct downstream IAB nodes (IAB3-5) and one further downstream IAB node (IAB6). The delivery status that the IAB2 sends to the CU only concerns the traffic of its two served UEs (UE2_1 and UE2_2), as well as some traffic (e.g., operations/administration/maintenance or OAM) that is sent to the MT parts of IAB3-5.

This is because the data intended for the UEs of the direct and further downstream IAB nodes is simply passed on via the adaptation layer and, as such, will not be reflected in the delivery status report from IAB2. One problem with this reporting arrangement is that congestion at IAB2 may be caused by traffic that is not accounted for in the delivery status reports. For example, such congestion at IAB2 can include traffic for delivery to UEs served by IAB3 (e.g., UE3_1 to UE3_a), JAB5 (e.g., UE5_1 to UE_5c), and/or IAB6 (e.g., UE6_1 to UE6_c). Thus, if there is heavy buffering/congestion at IAB2 due to heavy traffic passing through but not terminated at IAB2, IAB2 currently has no way of reporting that situation. Rather, IAB2 can only report whether or not the bearers of the UEs that it is directly serving (i.e., UE2_1 and UE2_2) are suffering dropped packets due to buffer overload, caused by excess traffic terminated by downstream IAB nodes (e.g., IAB3-6).

However, upon determining from the downlink delivery status that the throughput has decreased or there are some packet drops, the CU will throttle the traffic of the two UEs (UE 2_1 and UE 2_2) (i.e., stop pushing them towards the donor DU). This will not solve the problem because they were not the cause of the congestion to begin with.

A second drawback with the end-to-end flow control mechanism is that there is no way of pinpointing exactly where the problem is occurring in a multi-hop arrangement such as shown in FIG. 12. The problem could be in any of the intermediate nodes, but the CU will only see that throughput for those bearers has dropped and will throttle them. For example, a delivery status report from IAB6 indicating loss of throughput will not be useful to identify if the problem is in one of the upstream hops (e.g., IAB1-IAB2, IAB2-IAB4, or IAB4-IAB6) and/or caused by one or more specific UEs and/or bearers.

Exemplary embodiments of the present disclosure address these and other problems, challenges, and/or issues by providing a novel flow control mechanism in a multi-hop IAB network that mitigates the shortcomings of end-to-end flow control described above. This flow control mechanism can be used instead of or in a complementary fashion with end-to-end flow control. More specifically, certain embodiments of the present disclosure include a hop-by-hop flow control mechanism that sends an indication to a northbound IAB node to stop the transmission or decrease the rate of transmission of downlink data, along with the identity of the concerned IAB node(s) (adaptation layer address(es)) that are causing the congestion. When the congestion problem is relieved, an indication could be sent to the northbound IAB node to start the transmission or increase the rate of the transmission. The indication of the affected IAB node(s) in the flow control message enables the sender to continue to forward packets in the DL for UEs connected to other IAB nodes not experiencing congestion, while stopping the transmission and buffering packets or slowing down the transmission rate for packets belonging to the congested IAB node(s) in order to not overflow downstream buffers.

In addition, other embodiments include techniques for interworking hop-by-hop and end-to-end, where the triggering of one mechanism automatically triggers the other. For example, when sending a hop-by-hop flow control indication to a northbound IAB node, the IAB node triggering this indication also triggers a downlink delivery status to the CU.

In the embodiments described below, the text includes the phrases "the PDCP of the UE is configured with . . . " or the "RLC of the UE is configured with . . . ". Unless otherwise noted, this refers to the PDCP or to the RLC of the UE bearers. This could be for all the bearers or a selected subset of bearers, depending on the QoS requirements of the bearers.

Furthermore, although the embodiments are described below in the context of the IAB scenario, the underlying principles can be adapted to other exemplary embodiments applicable in any kind of multi-hop system where flow control functionality is available or desired between network nodes.

In the following discussion, the terms "northbound node" and "upstream node" are used interchangeably to refer to, from the point of view of a given node, a node that is serving the given node and/or positioned upstream in the IAB network with respect to the given node. Likewise, the terms "southbound node" and "downstream node" "are used interchangeably to refer to, from the point of view of a given node, a node that is being served by the given node and/or is downstream in the IAB network with respect to the given node.

The discussion below focuses on the controlling of the traffic flow due to hop-by-hop or/and end-to-end flow control. However, other actions could be triggered due to the reception of a flow control message instead of or in addition to the controlling of the traffic. These can include, for example, initiating a handover or path switch of a UE or an IAB node from one path/node to another path/node.

The techniques described herein may be divided into two general categories: a standalone hop-by-hop flow control, and integrated (i.e., combined) hop-by-hop and end-to-end flow control. Standalone hop-by-hop flow control will be discussed first.

The mechanisms presented rely on hop-by-hop flow control, where an IAB node sends an indication to its upstream IAB node regarding the downstream IAB node(s) or link(s) that is(are) congested or having poor radio conditions. A simple 0/1 flag could be used that indicates the northbound node to stop/start forwarding downlink traffic towards the node sending the indication. Another alternative is to use a range of values (for example, between 0 and 1, with a granularity of 0.1), where 0 indicates to stop the traffic, 1 means to send whatever traffic that is pending, and a value in between meaning a percentage of the available downlink traffic. Another alternative is a range of values that indicate the desired buffer size (between 0 and a certain maximum amount), such that the northbound node can send up to the indicated amount of data towards the node sending this message. Yet another alternative is to have the actual buffer status value rather than a range indicating relative value.

An IAB layer 2 adaptation address or addresses can also be included in the hop-by-hop flow control message, which determines that the flow control message is concerning only traffic that is addressed to the indicated address(es). For example, in the scenario shown in FIG. 12, IAB2 can send a hop-by-hop flow control indication to IAB1 that includes the 0 flag and adaptation layer address of IAB3, which will be interpreted by IAB1 to mean that it can keep on passing on data towards IAB2 as long as the data was not associated with IAB3's address at the adaptation layer. Thus, this will ensure that the traffic of other UEs and IAB nodes with proper links will not be penalized due to a congestion at IAB3 (e.g., due to bad radio condition towards its UEs). Several addresses can be combined with one flow control flag, or separate ones. Some examples are shown in Table 2 below, which should be read with the context of FIG. 12.

TABLE 2

| Flow control message from IAB2 to IAB1 | Meaning |
| --- | --- |
| [0 \| IAB2] | Stop transmission of all DL data (that is associated/addressed to IAB2) from IAB1 |
| [1 \| IAB2] | Start transmission of all DL data (that is associated/addressed to IAB2) from IAB1 |
| [1\| IAB4], [0\| IAB3, IAB5] | Stop transmission of DL data associated with nodes IAB3 and IAB5, while keep on forwarding data associated with IAB4. |
| [0.5\| IAB4, IAB3], [0.25 \| IAB5] | Reduce the transmission rate of the data associated with nodes IAB4 and IAB3 by half, and that of IAB5 by 75%. |

In one alternative, specifying an IAB node implies the traffic associated with the descendants of that IAB node will be treated the same way. For example, a flow control message [0|IAB4], sent from IAB2 to IAB1 will also stop the forwarding of data associated with IAB6 or any other descendant of IAB4 (and their descendants). The knowledge of which nodes are descendants of which can be configured in the node receiving the flow control message, or in. For example, IAB1 can be configured with the information indicating a flow control operation for IAB4 will also affect IAB6. Alternately, this knowledge can be configured in the node sending the flow control message (e.g., IAB2 in the same example). The configuration of which nodes are descendants of each other can be provided to the IAB nodes from a CU or Operation and Maintenance (OAM) system.

In another alternative, the flow control affects only the specified IAB node's traffic. In the above example, IAB2 will stop forwarding data towards IAB 2 for those packets that are associated only with IAB 4's address (i.e., only traffic of UEs directly connected to IAB4, and also the MT of the descendant IAB nodes served by IAB4 will be affected.)

Another alternative is to introduce an additional 0/1 flag to indicate whether the flow control message is concerned about all the descendant IAB nodes or IAB node(s) that follow(s) the flag. Some examples in the context of FIG. 12 are shown in Table 3 below. The additional flag value of 0 indicates the message affects all downstream or descendant nodes, while a flag value of 1 indicates the message affects only the indicated node.

TABLE 3

| Flow control message from IAB2 to IAB1 | Meaning |
| --- | --- |
| [0 0\| IAB2] | Stop transmission of all DL data that is associated with IAB2 and all of its descendant IAB nodes |
| [0.5 0\| IAB2] | Reduce the transmission rate by half of all DL data that is associated to IAB2 and all of its descendant IAB nodes |
| [0 1\| IAB2] | Stop transmission of all DL data that is associated to IAB2 only |
| [1 1\| IAB2] | Start transmission of all DL data that is associated to IAB2 only |
| [1 0\| IAB4], [0 1\| IAB3, IAB5] | Keep on forwarding data associated with IAB4 and all its descendant IAB nodes, while stop transmission of DL data associated with nodes IAB3 and IAB5 |
| [1 1\| IAB4], [0 1\| IAB3, IAB5] | Stop transmission of DL data associated with nodes IAB3 and IAB5, while keep on forwarding data associated with IAB4. |
| [0.5 1\| IAB4, IAB3], [0.25 1\| IAB5] | Reduce the transmission rate of the data associated with IAB4 and IAB3 by half, and that of IAB5 by 75%. |

Apart from the indication of the affected IAB node(s) and the flags to stop/start the flow or decrease/increase the transmission rate, additional information could be included in the flow control message, a time value can be included to indicate for how long this message is valid. For example, if the flow control message contains this additional time value and it is set to "10 sec", then the receiver node will apply the required action (e.g., stop the concerned traffic) for the net 10 secs and continue as normal after that. The benefit of such communication is that there is no need for sending another flow control message from the source to change the behavior of the parent node (e.g., re-start the flow of the concerned traffic).

The flow control message can be provided to the upstream node via MAC control Element (MAC CE) or an adaptation layer control element (Adapt CE). The Adapt CE is suitable for architecture design where adaptation is above RLC, while the MAC CE is suitable for adaptation placement just above MAC or integrated with MAC.

One exemplary benefit of having of an adaptation layer integrated with MAC is a one-to-one mapping between backhaul bearers and UE bearers. For example, there will be a UE ID field added to the MAC header that, along with the LCID, can uniquely identify the bearer over the backhaul links With such a structure, the MAC CE based flow control can be used to do flow control at the UE bearer level. However, the disadvantage of such a solution is that when there is a problem that affects several UEs, several such MAC CEs will be needed to communicate the problem.

For example, if the problem was a congestion at IAB3 or bad radio between IAB2 and IAB3, then with the MAC integrated adaptation and MAC CE based flow control, there will be a need to send a MAC CE corresponding to each UE connected to IAB3 (and if there were other descendant IAB nodes of IAB3, their UEs as well, and so on). With the adaptation layer terminated above RLC, and Adapt CE used for flow control, only one Adaptation CE needs to be sent from IAB2 to IAB1 that provides the same information. It is possible to enhance the MAC CE alternative by using an extra flag in the MAC CE that indicates that this message (e.g., to stop the traffic) is applicable for all DL traffic that is leaving the node that is receiving the message. However, this will not be as flexible as the Adaptation CE that can control traffic towards particular IAB node(s) rather than the enhanced MAC CE approach that affects all of them or just one UE on the path.

The receiving node of a flow control message could decide to propagate the flow control message towards its northbound node. For example, when IAB1 receives a flow control CE from IAB2, it can trigger the sending of a flow control CE towards the Donor DU. The triggering decision can be based on several factors, such as:

The current buffer status at IAB1; and/or

The severity of the received flow control message (E.g., a message requesting to stop all downlink traffic between IAB1 and IAB2 will be more severe than a message requesting to stop the traffic associated with IAB6, as the former will lead to faster buffer buildup at the IAB1 if the Donor CU/DU keep forwarding downlink traffic to the IAB1); and/or The percentage reduction value indicated; and/or Time elapsed since the reduction/stop flow control message has been received; and/or The rate at which the buffer changes at the IAB node (e.g., if it is growing quickly the IAB node can notify upper notes)

The flow control message propagated to the next hop may have the same structure as the flow control message received by the node propagating this message, or it may be a more complex one that includes the flow control message that triggered it embedded within itself. It could also be an aggregated message containing multiple flow control indications.

When the radio/buffer conditions improve, the IAB node can send a flow control message to its northbound node to re-start/increase the downlink traffic flow. The receiving node of this flow control message can trigger further flow control message to its northbound node, especially if it has earlier sent a flow control message that has started/throttled some flows.

In all the above examples, a one-to-one link from a node to its parent (i.e., a node having only one parent) was considered for the sake of brevity. However, it is possible to have a scenario where a node may have more than one parent (for example, for the sake of load balancing, redundancy, faster failover, etc.). When such a node that has multiple parents receives a flow control message from one of its descendants, it can use the information provided within (e.g., adaptation layer address(es)) to decide to which node that it will propagate it to. For example, consider IAB node x that has two descendant nodes y and z, and two parents t and s. If the route setup was such that data associated with y is sent via the path s→x→y and data associated with z was sent via t→x→z, and node x receives a flow control message from z, it is likely that the proper path to propagate the flow control message is towards node t, through which the data associated with z is passing through.

In other cases, an IAB node may provide flow control information to all of its parents in order to ensure that the DL data rates to the congested node are blocked or reduced for all possible paths leading to the congested node.

In all the above cases, it is assumed the child node is sending the flow control message based on some conditions such as noticing blockage on (one of) its radio links to its children or buffer buildup. In other alternatives, it is also possible for a parent node to request a flow control request message towards a child node. This can be a onetime request or it could include a configuration for multiple request based on a condition (e.g., periodical every time a timer expires, every time the buffer status reaches a certain absolute or relative threshold, etc.).

Next, the integration/combining of hop-by-hop flow control with end-to-end flow control may be considered. The hop-by-hop flow control discussed above can be quite effective to mitigate problems such as temporary radio blockage on a certain link. However, if the problem was more severe/longer term, then hop-by-hop flow control by itself may not be effective. For example, consider the scenario shown in FIG. 12, where a radio problem between IAB4 and IAB6 led IAB4 to send a flow control message towards IAB2 to stop the traffic associated with IAB6. This will prevent buffer buildup at IAB4. However, as long as IAB1 and the donor DU/CU are not aware of this, the data associated with IAB6 will keep piling up at IAB2, causing a buffer overflow and packet drop. Of course, IAB2 could also send a flow control message towards IAB1, and IAB1 later on to the donor, so that the donor stops the traffic associated with IAB6. However, this could take some time, and packet loss might have already occurred at IAB2 when the flow control message finally reaches the donor DU/CU. The more hops in the network, the more severe this problem will be.

One straightforward solution to this could be for the node receiving a flow control message to immediately (or wait until a timer ran out before receiving re-start/increase the downlink traffic flow message) propagate it to its parent(s). However, this could create a lot of unnecessary signaling and could result in the underutilization of network resources because even a temporary problem on some link several hops away could result in the stopping of the traffic at the CU/DU, and when that problem is resolved, yet another flow control message has to propagate all the way to the CU/DU to start the traffic again.

A mechanism to solve this problem is where the reception of a hop-by-hop flow control message could be used to trigger an end-to-end flow control message (e.g., downlink delivery status) from the node receiving the flow control message to the donor CU. This way, if the problem was severe and the buffer buildup was imminent, the end-to-end flow control message would be sent directly to the donor CU, without the need to wait for the hop-by-hop flow control message to propagate one link at a time all the way to the donor CU.

The severity of the problem and the decision whether to initiate end-to-end flow control (or propagate the hop-by-hop flow control message to the next hop) can be related to the QoS of the affected bearers. For example, assume that the IAB node has a buffering scheme where there are separate buffers for different QoS classes, and the path being affected (e.g., due bad radio conditions) was serving only bearers with low QoS requirements. The IAB node, upon receiving a hop-by-hop flow control message that affects only this path, may decide not to forward the hop-by-hop flow control message to the next hop, or not initiate an end-to-end flow control, because the possible buffer buildup that could happen at the IAB node will not affect the performance of other bearers with higher QoS requirements, as they are using separate buffers.

Figure 13:
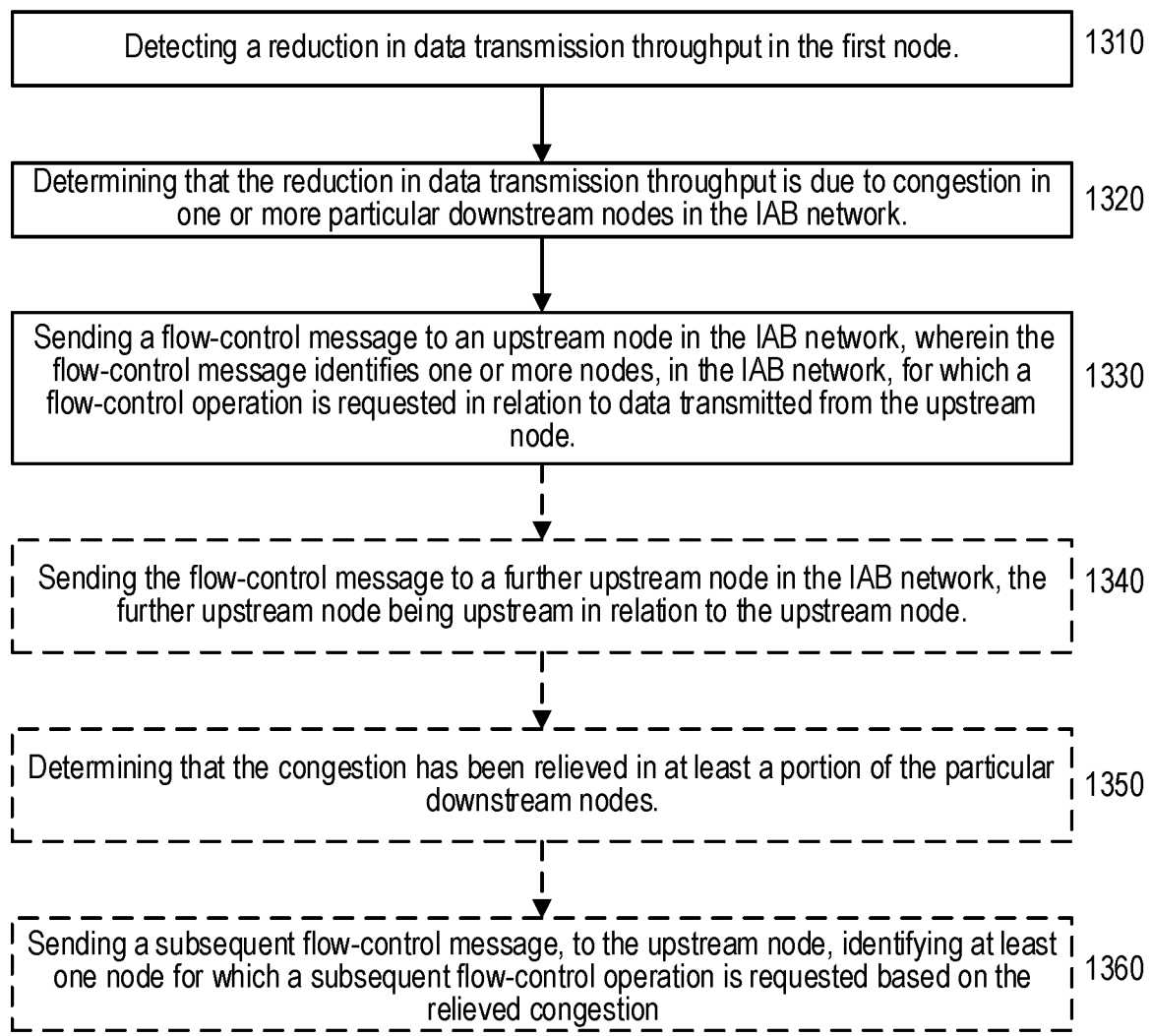
FIGS. 13-14 show flow diagrams of exemplary methods and/or procedures for nodes in an IAB network, according to various exemplary embodiments of the present disclosure.

FIG. 13 illustrates an exemplary method and/or procedure for flow control of data transmission from a base station to a plurality of user equipment (UEs) via an integrated access backhaul (IAB) network, according to various exemplary embodiments of the present disclosure. The exemplary method and/or procedure can be performed by a first node in the IAB network (e.g., downstream from a second node). Although the exemplary method and/or procedure is illustrated in FIG. 13 by blocks in a particular order, this order is exemplary and the operations corresponding to the blocks can be performed in different orders than shown, and can be combined and/or divided into blocks having different functionality than shown. Furthermore, the exemplary method and/or procedure shown in FIG. 13 can be used cooperatively with other exemplary methods and/or procedures disclosed herein (e.g., FIG. 14) to provide benefits, advantages, and/or solutions to problems described herein. Optional operations are indicated by dashed lines.

The exemplary method and/or procedure can include the operations of block 1310, where the first node can detect a reduction in data transmission throughput in the first node. The exemplary method and/or procedure can also include the operations of block 1320, where the first node can determine that the reduction in data transmission throughput is due to congestion in one or more particular downstream nodes in the IAB network.

The exemplary method and/or procedure can also include the operations of block 1330, where the first node can send a flow-control message to an upstream node in the IAB network. The flow-control message can identify one or more nodes, in the IAB network, for which a flow-control operation is requested in relation to data transmitted from the upstream node. In some embodiments, the identified one or more nodes can include the one or more particular downstream nodes. In some embodiments, the identified one or more nodes can include the first node. In some embodiments, the flow-control message can identify the one or more nodes based on identifying one or more radio bearers associated with one or more UEs being served by the one or more nodes.

In some embodiments, the flow-control message can also include a flag. In such case, a first value of the flag can indicate that a flow-control operation is requested in relation to data transmitted from the upstream node to the identified nodes. Likewise, a second value of the flag can indicate that a flow-control operation is requested in relation to data transmitted from the upstream node to the identified nodes, as well as data transmitted from the upstream node to further downstream nodes via the identified nodes.

In some embodiments, the flow-control message can also indicate a time period during which a flow-control operation should be performed in relation to data transmitted from the upstream node to the identified nodes. In some embodiments, the flow-control message can also identify the flow-control operation.

In some embodiments, the flow-control operation can include stopping or reducing data transmission from the upstream node to the identified one or more nodes. In such embodiments, the flow-control message can also include one or more parameters indicating an amount of reduction of the data transmission. In such embodiments, a particular value of the one or more parameters can indicate stopping the data transmission.

In some embodiments, the flow-control message can also identify one or more further nodes in the IAB network for which a further flow-control operation is requested in relation to data transmitted from the upstream node. In such embodiments, the flow-control message can also identify the further flow-control operation. In embodiments where the flow-control operation includes stopping or reducing data transmission (e.g., by a first amount) from the upstream node to the identified one or more nodes, the further flow control operation can include continuing or reducing data transmission (e.g., by a second amount) from the upstream node to the identified further nodes.

In some embodiments, the base station comprises a central unit (CU) and a distributed unit (DU) connected to the IAB radio network, and the DU is upstream with respect to the first node. In such case, the first node can send the flow-control message to the DU. If there is an intervening upstream node between the first node and the DU, however, the first node can send the flow-control message to the intervening node.

In some embodiments, the exemplary method and/or procedure can also include the operations of block 1340, where the first node can send the flow-control message to a further upstream node in the IAB network. The further upstream node can be upstream in relation to the upstream node (i.e., the node to which the flow-control message was send in block 1330). As an example, the first node can send the flow-control message to a DU that is further upstream relative to an intervening IAB node.

In some embodiments, the exemplary method and/or procedure can also include the operations of block 1350, where the first node can determine that the congestion has been relieved in at least a portion of the particular downstream nodes. In such embodiments, the exemplary method and/or procedure can also include the operations of block 1360, where the first node can send a subsequent flow-control message, to the upstream node, identifying at least one node for which a subsequent flow-control operation is requested based on the relieved congestion. In some embodiments, the subsequent flow-control operation can include resuming or increasing data transmission from the upstream node to the identified at least one node. In some embodiments, the subsequent flow-control message can also identify the subsequent flow-control operation.

Figure 14:
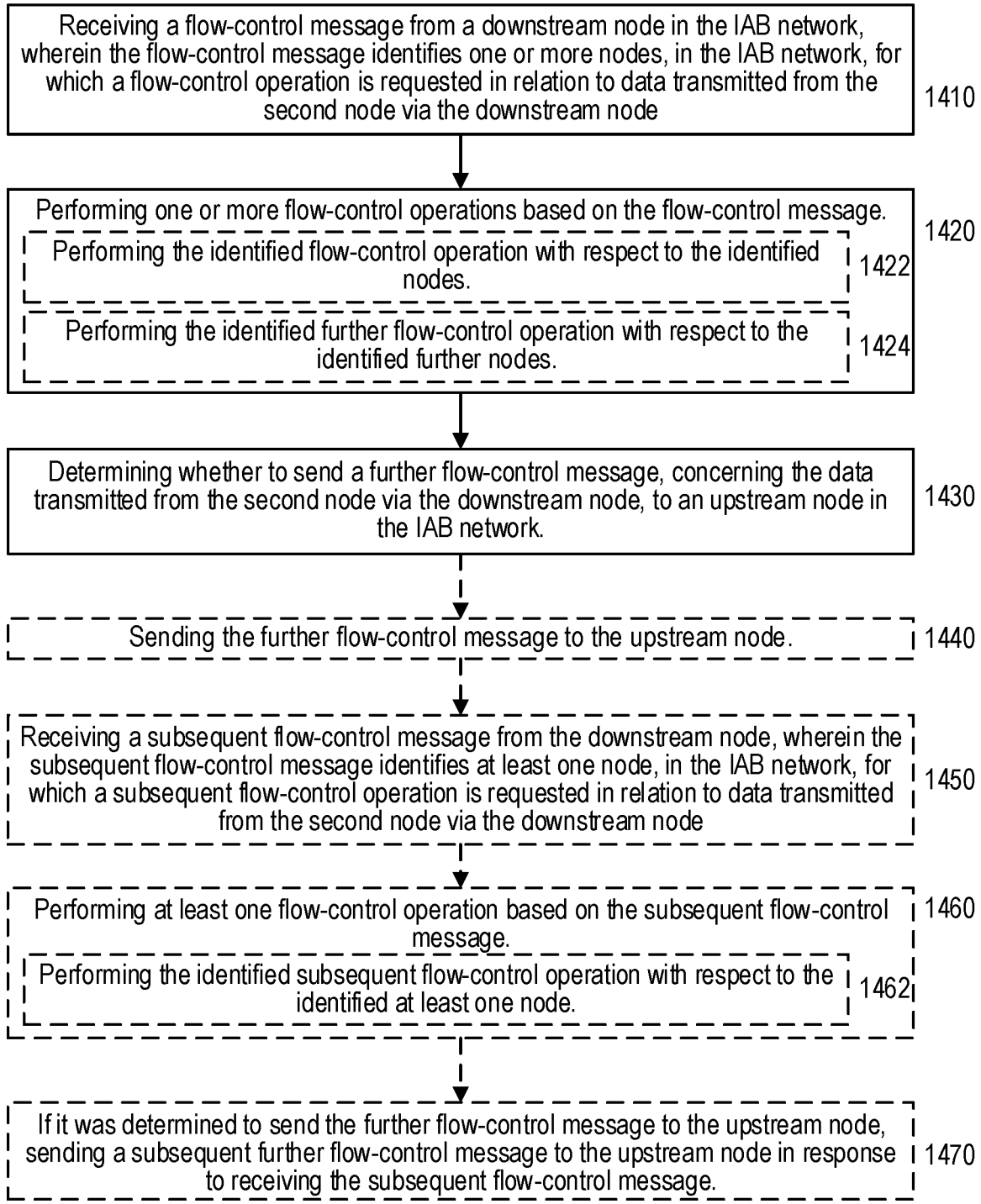

FIG. 14 illustrates an exemplary method and/or procedure for flow control of data transmission from a base station to a plurality of user equipment (UEs) via an integrated access backhaul (IAB) network, according to various exemplary embodiments of the present disclosure. The exemplary method and/or procedure can be performed by a second node in the IAB network (e.g., upstream from a first node). Although the exemplary method and/or procedure is illustrated in FIG. 14 by blocks in a particular order, this order is exemplary and the operations corresponding to the blocks can be performed in different orders than shown, and can be combined and/or divided into blocks having different functionality than shown. Furthermore, the exemplary method and/or procedure shown in FIG. 14 can be used cooperatively with other exemplary methods and/or procedures disclosed herein (e.g., FIG. 13) to provide benefits, advantages, and/or solutions to problems described herein. Optional operations are indicated by dashed lines.

The exemplary method and/or procedure can include the operations of block 1410, where the second node can receive a flow-control message from a downstream node in the IAB network. The flow-control message can identify one or more nodes, in the IAB network, for which a flow-control operation is requested in relation to data transmitted from the second node via the downstream node. In some embodiments, the identified one or more nodes can include one or more downstream nodes in which congestion has been detected. In some embodiments, the identified one or more nodes can include the downstream node (i.e., the node sending the message). In some embodiments, the flow-control message can identify the one or more nodes based on identifying one or more radio bearers associated with one or more UEs being served by the one or more nodes.

In some embodiments, the flow-control message can also include a flag. In such case, a first value of the flag can indicate that a flow-control operation is requested in relation to data transmitted from the second node to the identified nodes. Likewise, a second value of the flag can indicate that a flow-control operation is requested in relation to data transmitted from the second node to the identified nodes, as well as data transmitted from the second node to further downstream nodes via the identified nodes.

In some embodiments, the flow-control message can also indicate a time period during which a flow-control operation should be performed in relation to data transmitted from the second node to the identified nodes. In some embodiments, the flow-control message can also identify the flow-control operation.

In some embodiments, the flow-control operation can include stopping or reducing data transmission from the second node to the identified nodes. In such embodiments, the flow-control message can also include one or more parameters indicating an amount of reduction of the data transmission. In such embodiments, a particular value of the one or more parameters can indicate stopping the data transmission.

In some embodiments, the flow-control message can also identify one or more further nodes in the IAB network for which a further flow-control operation is requested in relation to data transmitted from the upstream node. In such embodiments, the flow-control message can also identify the further flow-control operation. In embodiments where the flow-control operation includes stopping or reducing data transmission (e.g., by a first amount) from the upstream node to the identified one or more nodes, the further flow control operation can include continuing or reducing data transmission (e.g., by a second amount) from the upstream node to the identified further nodes.

The exemplary method and/or procedure can include the operations of block 1420, where the second node can perform one or more flow-control operations based on the flow-control message. In some embodiments, the operations of block 1420 can include the operations of block 1422, where the second node can perform the identified flow-control operation in relation to the identified one or more nodes. In some embodiments, the operations of block 1420 can include the operations of block 1424, where the second node can perform the identified further flow-control operation in relation to the identified further nodes.

The exemplary method and/or procedure can include the operations of block 1430, where the second node can determine whether to send a further flow-control message, concerning the data transmitted from the second node via the downstream node, to an upstream node in the IAB network. In some embodiments, determining whether to send the further flow-control message can be based on at least one of the following factors: data buffer levels at the second node; rate of change in data buffer levels at the second node; the one or more flow-control operation performed; and the elapsed time since the flow-control message was received by the second node. In some embodiments, the exemplary method and/or procedure can also include the operations of block 1440, where the second node can send the further flow-control message to the upstream node. In some embodiments, the further flow-control message can encapsulate the flow-control message received by the second node.

In some embodiments, the exemplary method and/or procedure can also include the operations of block 1450, where the second node can receive a subsequent flow-control message from the downstream node. The subsequent flow-control message can identify at least one node, in the IAB network, for which a subsequent flow-control operation is requested in relation to data transmitted from the second node via the downstream node. In such embodiments, the exemplary method and/or procedure can also include the operations of block 1460, where the second node can perform at least one flow-control operation based on the subsequent flow-control message. In some embodiments, the subsequent flow-control message can also identify the subsequent flow-control operation. In such embodiments, the operations of block 1460 can include the operations of sub-block 1462, where the second node can perform the identified subsequent flow-control operation with respect to the identified at least one node. In some embodiments, the subsequent flow-control operation can include resuming or increasing data transmission to the identified at least one node.

In some embodiments, the exemplary method and/or procedure can also include the operations of block 1470, where the second node can, it was determined to send the further flow-control message to the upstream node (e.g., in block 1430), send a subsequent further flow-control message to the upstream node in response to receiving the subsequent flow-control message from the downstream node. In some embodiments, the subsequent further flow-control message can encapsulate the subsequent flow-control message.

In some embodiments, the base station comprises a central unit (CU) and a distributed unit (DU) connected to the IAB radio network, and the DU is upstream with respect to the second node. In such case, the second node can send the further flow-control message and/or the subsequent further flow-control message to the DU. If there is an intervening upstream node between the second node and the DU, however, the second node can send the further flow-control message and/or the subsequent further flow control message to the intervening node.

Figure 15:
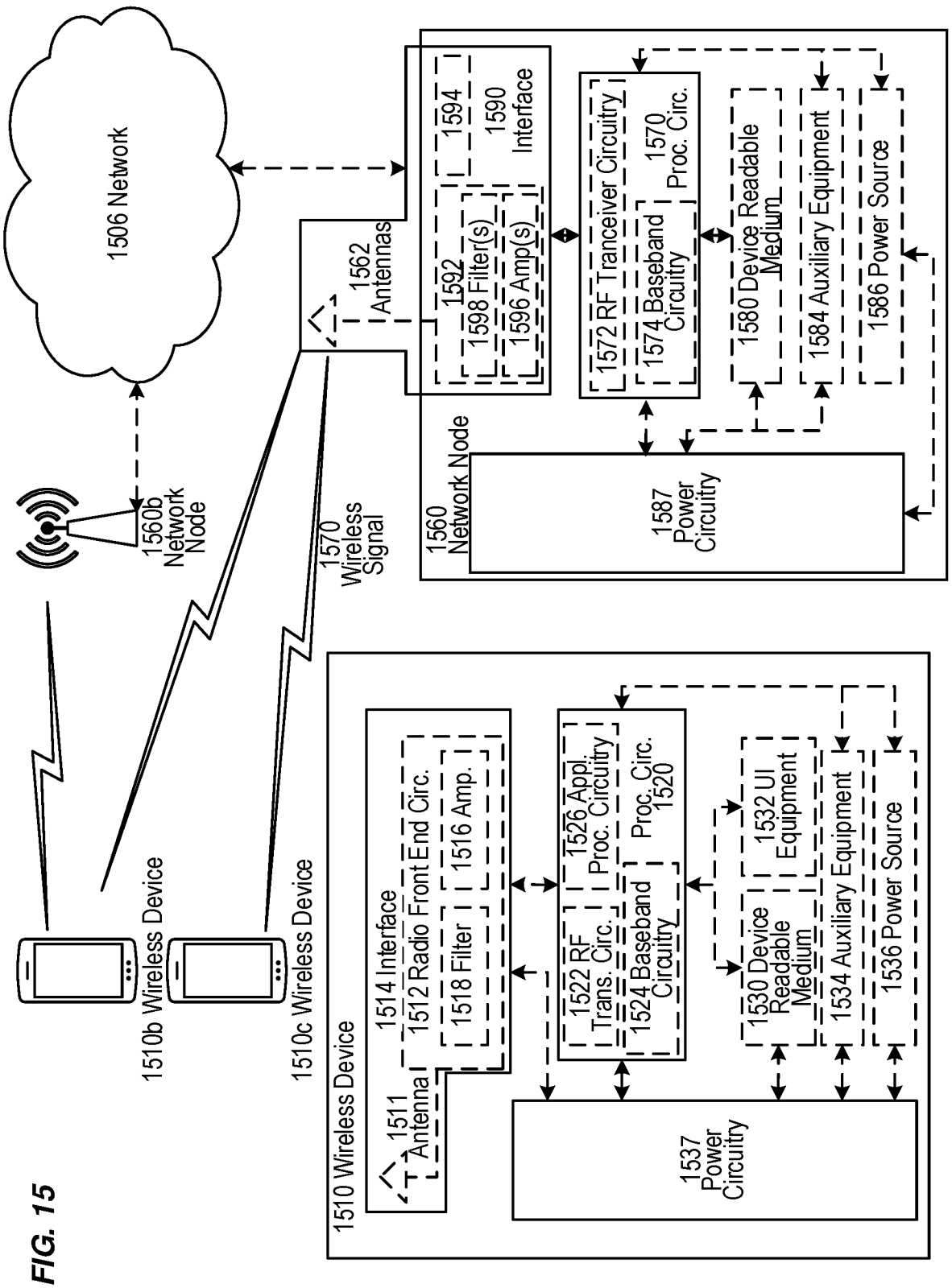
FIG. 15 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560*b*, and WDs 1510, 1510*b*, and 1510*c*. In practice, a wireless network can further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1560 are depicted as single boxes located within a larger box, or nested within multiple boxes, in practice, a network node can comprise multiple different physical components that make up a single illustrated component (e.g., device readable medium 1580 can comprise multiple separate hard drives as well as multiple RAM modules).

Similarly, network node 1560 can be composed of multiple physically separate components (e.g., a NodeB component and a RNC component, or a BTS component and a BSC component, etc.), which can each have their own respective components. In certain scenarios in which network node 1560 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1560 can be configured to support multiple radio access technologies (RATs). In such embodiments, some components can be duplicated (e.g., separate device readable medium 1580 for the different RATs) and some components can be reused (e.g., the same antenna 1562 can be shared by the RATs). Network node 1560 can also include multiple sets of the various illustrated components for different wireless technologies integrated into network node 1560, such as, for example, GSM, WCDMA, LTE, NR, WiFi, or Bluetooth wireless technologies. These wireless technologies can be integrated into the same or different chip or set of chips and other components within network node 1560.

Processing circuitry 1570 can be configured to perform any determining, calculating, or similar operations (e.g., certain obtaining operations) described herein as being provided by a network node. These operations performed by processing circuitry 1570 can include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 can execute instructions stored in device readable medium 1580 or in memory within processing circuitry 1570. Such functionality can include providing any of the various wireless features, functions, or benefits discussed herein. In some embodiments, processing circuitry 1570 can include a system on a chip (SOC).

In some embodiments, processing circuitry 1570 can include one or more of radio frequency (RF) transceiver circuitry 1572 and baseband processing circuitry 1574. In some embodiments, radio frequency (RF) transceiver circuitry 1572 and baseband processing circuitry 1574 can be on separate chips (or sets of chips), boards, or units, such as radio units and digital units. In alternative embodiments, part or all of RF transceiver circuitry 1572 and baseband processing circuitry 1574 can be on the same chip or set of chips, boards, or units In certain embodiments, some or all of the functionality described herein as being provided by a network node, base station, eNB or other such network device can be performed by processing circuitry 1570 executing instructions stored on device readable medium 1580 or memory within processing circuitry 1570. In alternative embodiments, some or all of the functionality can be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1570. Device readable medium 1580 can store any suitable instructions, data or information, including a computer program, software, an application including one or more of logic, rules, code, tables, etc. and/or other instructions capable of being executed by processing circuitry 1570 and, utilized by network node 1560. Device readable medium 1580 can be used to store any calculations made by processing circuitry 1570 and/or any data received via interface 1590. In some embodiments, processing circuitry 1570 and device readable medium 1580 can be considered to be integrated.

Interface 1590 is used in the wired or wireless communication of signalling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that can be coupled to, or in certain embodiments a part of, antenna 1562. Radio front end circuitry 1592 comprises filters 1598 and amplifiers 1596. Radio front end circuitry 1592 can be connected to antenna 1562 and processing circuitry 1570. Radio front end circuitry can be configured to condition signals communicated between antenna 1562 and processing circuitry 1570. Radio front end circuitry 1592 can receive digital data that is to be sent out to other network nodes or WDs via a wireless connection. Radio front end circuitry 1592 can convert the digital data into a radio signal having the appropriate channel and bandwidth parameters using a combination of filters 1598 and/or amplifiers 1596. The radio signal can then be transmitted via antenna 1562. Similarly, when receiving data, antenna 1562 can collect radio signals which are then converted into digital data by radio front end circuitry 1592. The digital data can be passed to processing circuitry 1570. In other embodiments, the interface can comprise different components and/or different combinations of components.

In certain alternative embodiments, network node 1560 may not include separate radio front end circuitry 1592, instead, processing circuitry 1570 can comprise radio front end circuitry and can be connected to antenna 1562 without separate radio front end circuitry 1592. Similarly, in some embodiments, all or some of RF transceiver circuitry 1572 can be considered a part of interface 1590. In still other embodiments, interface 1590 can include one or more ports or terminals 1594, radio front end circuitry 1592, and RF transceiver circuitry 1572, as part of a radio unit (not shown), and interface 1590 can communicate with baseband processing circuitry 1574, which is part of a digital unit (not shown).

Antenna 1562 can include one or more antennas, or antenna arrays, configured to send and/or receive wireless signals. Antenna 1562 can be coupled to radio front end circuitry 1590 and can be any type of antenna capable of transmitting and receiving data and/or signals wirelessly. In some embodiments, antenna 1562 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1562 can be separate from network node 1560 and can be connectable to network node 1560 through an interface or port.

Antenna 1562, interface 1590, and/or processing circuitry 1570 can be configured to perform any receiving operations and/or certain obtaining operations described herein as being performed by a network node. Any information, data and/or signals can be received from a wireless device, another network node and/or any other network equipment. Similarly, antenna 1562, interface 1590, and/or processing circuitry 1570 can be configured to perform any transmitting operations described herein as being performed by a network node. Any information, data and/or signals can be transmitted to a wireless device, another network node and/or any other network equipment.

Power circuitry 1587 can comprise, or be coupled to, power management circuitry and can be configured to supply the components of network node 1560 with power for performing the functionality described herein. Power circuitry 1587 can receive power from power source 1586. Power source 1586 and/or power circuitry 1587 can be configured to provide power to the various components of network node 1560 in a form suitable for the respective components (e.g., at a voltage and current level needed for each respective component). Power source 1586 can either be included in, or external to, power circuitry 1587 and/or network node 1560. For example, network node 1560 can be connectable to an external power source (e.g., an electricity outlet) via an input circuitry or interface such as an electrical cable, whereby the external power source supplies power to power circuitry 1587. As a further example, power source 1586 can comprise a source of power in the form of a battery or battery pack which is connected to, or integrated in, power circuitry 1587. The battery can provide backup power should the external power source fail. Other types of power sources, such as photovoltaic devices, can also be used.

Alternative embodiments of network node 1560 can include additional components beyond those shown in FIG. 15 that can be responsible for providing certain aspects of the network node's functionality, including any of the functionality described herein and/or any functionality necessary to support the subject matter described herein. For example, network node 1560 can include user interface equipment to allow and/or facilitate input of information into network node 1560 and to allow and/or facilitate output of information from network node 1560. This can allow and/or facilitate a user to perform diagnostic, maintenance, repair, and other administrative functions for network node 1560.

In some embodiments, a wireless device (WD, e.g., WD 1510) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 can include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies can be integrated into the same or different chips or set of chips as other components within WD 1510.

Antenna 1511 can include one or more antennas or antenna arrays, configured to send and/or receive wireless signals, and is connected to interface 1514. In certain alternative embodiments, antenna 1511 can be separate from WD 1510 and be connectable to WD 1510 through an interface or port. Antenna 1511, interface 1514, and/or processing circuitry 1520 can be configured to perform any receiving or transmitting operations described herein as being performed by a WD. Any information, data and/or signals can be received from a network node and/or another WD. In some embodiments, radio front end circuitry and/or antenna 1511 can be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520, and can be configured to condition signals communicated between antenna 1511 and processing circuitry 1520. Radio front end circuitry 1512 can be coupled to or a part of antenna 1511. In some embodiments, WD 1510 may not include separate radio front end circuitry 1512; rather, processing circuitry 1520 can comprise radio front end circuitry and can be connected to antenna 1511. Similarly, in some embodiments, some or all of RF transceiver circuitry 1522 can be considered a part of interface 1514. Radio front end circuitry 1512 can receive digital data that is to be sent out to other network nodes or WDs via a wireless connection. Radio front end circuitry 1512 can convert the digital data into a radio signal having the appropriate channel and bandwidth parameters using a combination of filters 1518 and/or amplifiers 1516. The radio signal can then be transmitted via antenna 1511. Similarly, when receiving data, antenna 1511 can collect radio signals which are then converted into digital data by radio front end circuitry 1512. The digital data can be passed to processing circuitry 1520. In other embodiments, the interface can comprise different components and/or different combinations of components.

Processing circuitry 1520 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality can include providing any of the various wireless features or benefits discussed herein. For example, processing circuitry 1520 can execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry can comprise different components and/or different combinations of components. In certain embodiments processing circuitry 1520 of WD 1510 can comprise a SOC. In some embodiments, RF transceiver circuitry 1522, baseband processing circuitry 1524, and application processing circuitry 1526 can be on separate chips or sets of chips. In alternative embodiments, part or all of baseband processing circuitry 1524 and application processing circuitry 1526 can be combined into one chip or set of chips, and RF transceiver circuitry 1522 can be on a separate chip or set of chips. In still alternative embodiments, part or all of RF transceiver circuitry 1522 and baseband processing circuitry 1524 can be on the same chip or set of chips, and application processing circuitry 1526 can be on a separate chip or set of chips. In yet other alternative embodiments, part or all of RF transceiver circuitry 1522, baseband processing circuitry 1524, and application processing circuitry 1526 can be combined in the same chip or set of chips. In some embodiments, RF transceiver circuitry 1522 can be a part of interface 1514. RF transceiver circuitry 1522 can condition RF signals for processing circuitry 1520.

In certain embodiments, some or all of the functionality described herein as being performed by a WD can be provided by processing circuitry 1520 executing instructions stored on device readable medium 1530, which in certain embodiments can be a computer-readable storage medium. In alternative embodiments, some or all of the functionality can be provided by processing circuitry 1520 without executing instructions stored on a separate or discrete device readable storage medium, such as in a hard-wired manner In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 can be configured to perform any determining, calculating, or similar operations (e.g., certain obtaining operations) described herein as being performed by a WD. These operations, as performed by processing circuitry 1520, can include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 can be operable to store a computer program, software, an application including one or more of logic, rules, code, tables, etc. and/or other instructions capable of being executed by processing circuitry 1520. Device readable medium 1530 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1520. In some embodiments, processing circuitry 1520 and device readable medium 1530 can be considered to be integrated.

User interface equipment 1532 can include components that allow and/or facilitate a human user to interact with WD 1510. Such interaction can be of many forms, such as visual, audial, tactile, etc. User interface equipment 1532 can be operable to produce output to the user and to allow and/or facilitate the user to provide input to WD 1510. The type of interaction can vary depending on the type of user interface equipment 1532 installed in WD 1510. For example, if WD 1510 is a smart phone, the interaction can be via a touch screen; if WD 1510 is a smart meter, the interaction can be through a screen that provides usage (e.g., the number of gallons used) or a speaker that provides an audible alert (e.g., if smoke is detected). User interface equipment 1532 can include input interfaces, devices and circuits, and output interfaces, devices and circuits. User interface equipment 1532 can be configured to allow and/or facilitate input of information into WD 1510, and is connected to processing circuitry 1520 to allow and/or facilitate processing circuitry 1520 to process the input information. User interface equipment 1532 can include, for example, a microphone, a proximity or other sensor, keys/buttons, a touch display, one or more cameras, a USB port, or other input circuitry. User interface equipment 1532 is also configured to allow and/or facilitate output of information from WD 1510, and to allow and/or facilitate processing circuitry 1520 to output information from WD 1510. User interface equipment 1532 can include, for example, a speaker, a display, vibrating circuitry, a USB port, a headphone interface, or other output circuitry. Using one or more input and output interfaces, devices, and circuits, of user interface equipment 1532, WD 1510 can communicate with end users and/or the wireless network, and allow and/or facilitate them to benefit from the functionality described herein.

Auxiliary equipment 1534 is operable to provide more specific functionality which may not be generally performed by WDs. This can comprise specialized sensors for doing measurements for various purposes, interfaces for additional types of communication such as wired communications etc. The inclusion and type of components of auxiliary equipment 1534 can vary depending on the embodiment and/or scenario.

Power source 1536 can, in some embodiments, be in the form of a battery or battery pack. Other types of power sources, such as an external power source (e.g., an electricity outlet), photovoltaic devices or power cells, can also be used. WD 1510 can further comprise power circuitry 1537 for delivering power from power source 1536 to the various parts of WD 1510 which need power from power source 1536 to carry out any functionality described or indicated herein. Power circuitry 1537 can in certain embodiments comprise power management circuitry. Power circuitry 1537 can additionally or alternatively be operable to receive power from an external power source; in which case WD 1510 can be connectable to the external power source (such as an electricity outlet) via input circuitry or an interface such as an electrical power cable. Power circuitry 1537 can also in certain embodiments be operable to deliver power from an external power source to power source 1536. This can be, for example, for the charging of power source 1536. Power circuitry 1537 can perform any converting or other modification to the power from power source 1536 to make it suitable for supply to the respective components of WD 1510.

Figure 16:
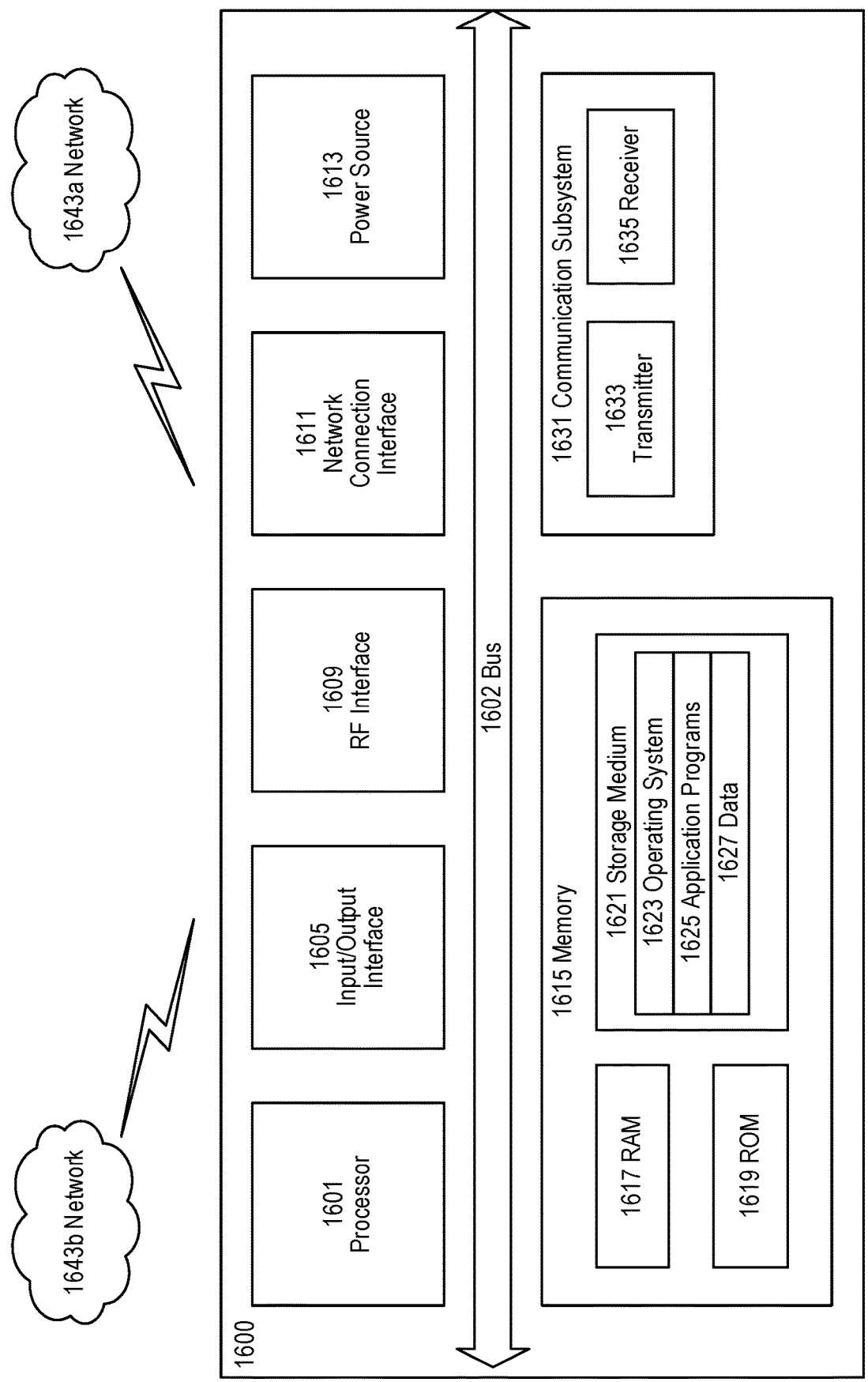
FIG. 16 illustrates an exemplary embodiment of a UE, in accordance with various aspects described herein.

FIG. 16 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 16200 can be any UE identified by the 3$^{rd}$ Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 can include other similar types of information. Certain UEs can utilize all of the components shown in FIG. 16, or only a subset of the components. The level of integration between the components can vary from one UE to another UE. Further, certain UEs can contain multiple instances of a component, such as multiple processors, memories, transceivers, transmitters, receivers, etc.

In FIG. 16, processing circuitry 1601 can be configured to process computer instructions and data. Processing circuitry 1601 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 can include two central processing units (CPUs). Data can be information in a form suitable for use by a computer.

In the depicted embodiment, input/output interface 1605 can be configured to provide a communication interface to an input device, output device, or input and output device. UE 1600 can be configured to use an output device via input/output interface 1605. An output device can use the same type of interface port as an input device. For example, a USB port can be used to provide input to and output from UE 1600. The output device can be a speaker, a sound card, a video card, a display, a monitor, a printer, an actuator, an emitter, a smartcard, another output device, or any combination thereof. UE 1600 can be configured to use an input device via input/output interface 1605 to allow and/or facilitate a user to capture information into UE 1600. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 16, RF interface 1609 can be configured to provide a communication interface to RF components such as a transmitter, a receiver, and an antenna. Network connection interface 1611 can be configured to provide a communication interface to network 1643*a*. Network 1643*a* can encompass wired and/or wireless networks such as a local-area network (LAN), a wide-area network (WAN), a computer network, a wireless network, a telecommunications network, another like network or any combination thereof. For example, network 1643*a* can comprise a Wi-Fi network. Network connection interface 1611 can be configured to include a receiver and a transmitter interface used to communicate with one or more other devices over a communication network according to one or more communication protocols, such as Ethernet, TCP/IP, SONET, ATM, or the like. Network connection interface 1611 can implement receiver and transmitter functionality appropriate to the communication network links (e.g., optical, electrical, and the like). The transmitter and receiver functions can share circuit components, software or firmware, or alternatively can be implemented separately.

RAM 1617 can be configured to interface via bus 1602 to processing circuitry 1601 to provide storage or caching of data or computer instructions during the execution of software programs such as the operating system, application programs, and device drivers. ROM 1619 can be configured to provide computer instructions or data to processing circuitry 1601. For example, ROM 1619 can be configured to store invariant low-level system code or data for basic system functions such as basic input and output (I/O), startup, or reception of keystrokes from a keyboard that are stored in a non-volatile memory. Storage medium 1621 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 can be configured to include operating system 1623, application program 1625 such as a web browser application, a widget or gadget engine or another application, and data file 1627. Storage medium 1621 can store, for use by UE 1600, any of a variety of various operating systems or combinations of operating systems.

Storage medium 1621 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 can allow and/or facilitate UE 1600 to access computer-executable instructions, application programs or the like, stored on transitory or non-transitory memory media, to off-load data, or to upload data. An article of manufacture, such as one utilizing a communication system can be tangibly embodied in storage medium 1621, which can comprise a device readable medium.

In FIG. 16, processing circuitry 1601 can be configured to communicate with network 1643*b* using communication subsystem 1631. Network 1643*a* and network 1643*b* can be the same network or networks or different network or networks. Communication subsystem 1631 can be configured to include one or more transceivers used to communicate with network 1643*b*. For example, communication subsystem 1631 can be configured to include one or more transceivers used to communicate with one or more remote transceivers of another device capable of wireless communication such as another WD, UE, or base station of a radio access network (RAN) according to one or more communication protocols, such as IEEE 802.16, CDMA, WCDMA, GSM, LTE, UTRAN, WiMax, or the like. Each transceiver can include transmitter 1633 and/or receiver 1635 to implement transmitter or receiver functionality, respectively, appropriate to the RAN links (e.g., frequency allocations and the like). Further, transmitter 1633 and receiver 1635 of each transceiver can share circuit components, software or firmware, or alternatively can be implemented separately.

In the illustrated embodiment, the communication functions of communication subsystem 1631 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 can include cellular communication, Wi-Fi communication, Bluetooth communication, and GPS communication. Network 1643*b* can encompass wired and/or wireless networks such as a local-area network (LAN), a wide-area network (WAN), a computer network, a wireless network, a telecommunications network, another like network or any combination thereof. For example, network 1643*b* can be a cellular network, a Wi-Fi network, and/or a near-field network. Power source 1613 can be configured to provide alternating current (AC) or direct current (DC) power to components of UE 1600.

The features, benefits and/or functions described herein can be implemented in one of the components of UE 1600 or partitioned across multiple components of UE 1600. Further, the features, benefits, and/or functions described herein can be implemented in any combination of hardware, software or firmware. In one example, communication subsystem 1631 can be configured to include any of the components described herein. Further, processing circuitry 1601 can be configured to communicate with any of such components over bus 1602. In another example, any of such components can be represented by program instructions stored in memory that when executed by processing circuitry 1601 perform the corresponding functions described herein. In another example, the functionality of any of such components can be partitioned between processing circuitry 1601 and communication subsystem 1631. In another example, the non-computationally intensive functions of any of such components can be implemented in software or firmware and the computationally intensive functions can be implemented in hardware.

Figure 17:
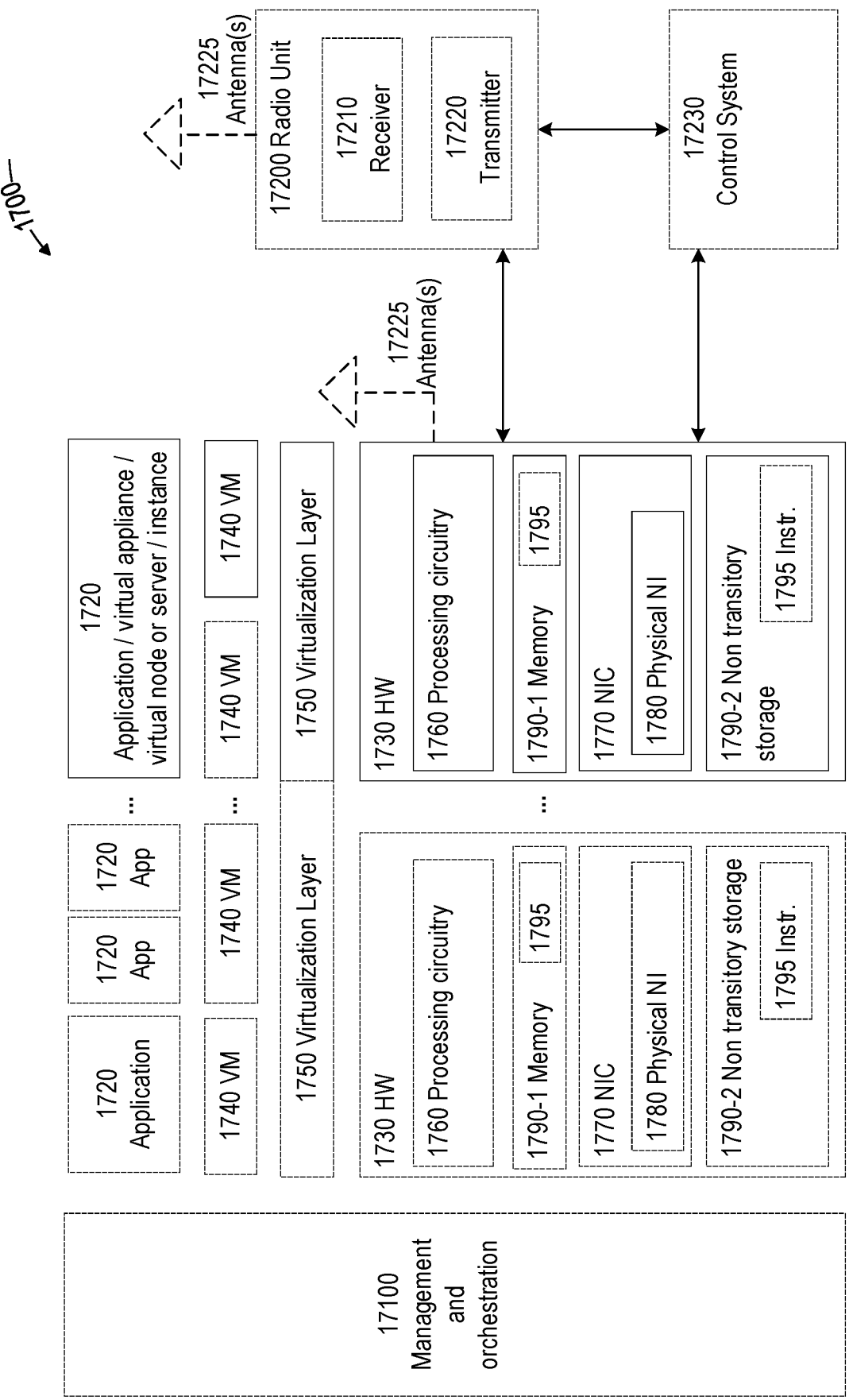
FIG. 17 is a block diagram illustrating an exemplary virtualization environment usable for implementation of various embodiments of network nodes described herein.

FIG. 17 is a schematic block diagram illustrating a virtualization environment 1700 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node can be entirely virtualized.

The functions can be implemented by one or more applications 1720 (which can alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which can be commercial off-the-shelf (COTS) processors, dedicated Application Specific Integrated Circuits (ASICs), or any other type of processing circuitry including digital or analog hardware components or special purpose processors. Each hardware device can comprise memory 1790-1 which can be non-persistent memory for temporarily storing instructions 1795 or software executed by processing circuitry 1760. Each hardware device can comprise one or more network interface controllers (NICs) 1770, also known as network interface cards, which include physical network interface 1780. Each hardware device can also include non-transitory, persistent, machine-readable storage media 1790-2 having stored therein software 1795 and/or instructions executable by processing circuitry 1760. Software 1795 can include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and can be run by a corresponding virtualization layer 1750 or hypervisor. Different embodiments of the instance of virtual appliance 1720 can be implemented on one or more of virtual machines 1740, and the implementations can be made in different ways.

During operation, processing circuitry 1760 executes software 1795 to instantiate the hypervisor or virtualization layer 1750, which can sometimes be referred to as a virtual machine monitor (VMM). Virtualization layer 1750 can present a virtual operating platform that appears like networking hardware to virtual machine 1740.

As shown in FIG. 17, hardware 1730 can be a standalone network node with generic or specific components. Hardware 1730 can comprise antenna 17225 and can implement some functions via virtualization. Alternatively, hardware 1730 can be part of a larger cluster of hardware (e.g., such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1740 can be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 can be coupled to one or more antennas 17225. Radio units 17200 can communicate directly with hardware nodes 1730 via one or more appropriate network interfaces and can be used in combination with the virtual components to provide a virtual node with radio capabilities, such as a radio access node or a base station.

In some embodiments, some signalling can be effected with the use of control system 17230 which can alternatively be used for communication between the hardware nodes 1730 and radio units 17200.

Figure 18:
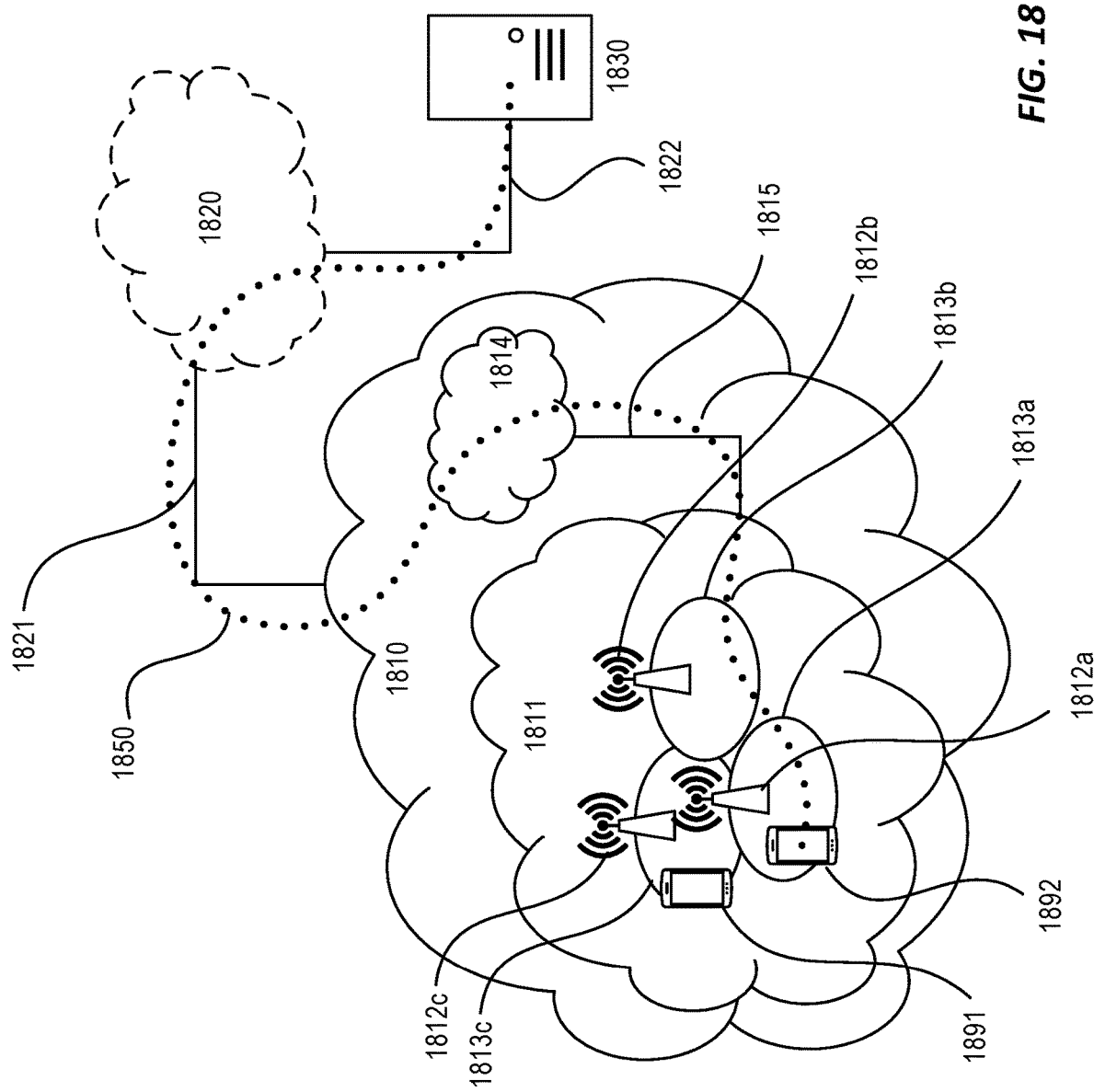
FIGS. 18-19 are block diagrams of various exemplary communication systems and/or networks, in accordance with various aspects described herein.

With reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812a, 1812b, 1812c, such as NBs, eNBs, gNBs or other types of wireless access points, each defining a corresponding coverage area 1813a, 1813b, 1813c. Each base station 1812a, 1812b, 1812c is connectable to core network 1814 over a wired or wireless connection 1815. A first UE 1891 located in coverage area 1813c can be configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which can be embodied in the hardware and/or software of a standalone server, a cloud-implemented server, a distributed server or as processing resources in a server farm. Host computer 1830 can be under the ownership or control of a service provider, or can be operated by the service provider or on behalf of the service provider. Connections 1821 and 1822 between telecommunication network 1810 and host computer 1830 can extend directly from core network 1814 to host computer 1830 or can go via an optional intermediate network 1820. Intermediate network 1820 can be one of, or a combination of more than one of, a public, private or hosted network; intermediate network 1820, if any, can be a backbone network or the Internet; in particular, intermediate network 1820 can comprise two or more sub-networks (not shown).

The communication system of FIG. 18 as a whole enables connectivity between the connected UEs 1891, 1892 and host computer 1830. The connectivity can be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 can be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which can have storage and/or processing capabilities. In particular, processing circuitry 1918 can comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 can be operable to provide a service to a remote user, such as UE 1930 connecting via OTT connection 1950 terminating at UE 1930 and host computer 1910. In providing the service to the remote user, host application 1912 can provide user data which is transmitted using OTT connection 1950.

Communication system 1900 can also include base station 1920 provided in a telecommunication system and comprising hardware 1925 enabling it to communicate with host computer 1910 and with UE 1930. Hardware 1925 can include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 can be configured to facilitate connection 1960 to host computer 1910. Connection 1960 can be direct or it can pass through a core network (not shown in FIG. 19) of the telecommunication system and/or through one or more intermediate networks outside the telecommunication system. In the embodiment shown, hardware 1925 of base station 1920 can also include processing circuitry 1928, which can comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 can also include UE 1930 already referred to. Its hardware 1935 can include radio interface 1937 configured to set up and maintain wireless connection 1970 with a base station serving a coverage area in which UE 1930 is currently located. Hardware 1935 of UE 1930 can also include processing circuitry 1938, which can comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 can be operable to provide a service to a human or non-human user via UE 1930, with the support of host computer 1910. In host computer 1910, an executing host application 1912 can communicate with the executing client application 1932 via OTT connection 1950 terminating at UE 1930 and host computer 1910. In providing the service to the user, client application 1932 can receive request data from host application 1912 and provide user data in response to the request data. OTT connection 1950 can transfer both the request data and the user data. Client application 1932 can interact with the user to generate the user data that it provides.

Figure 19:
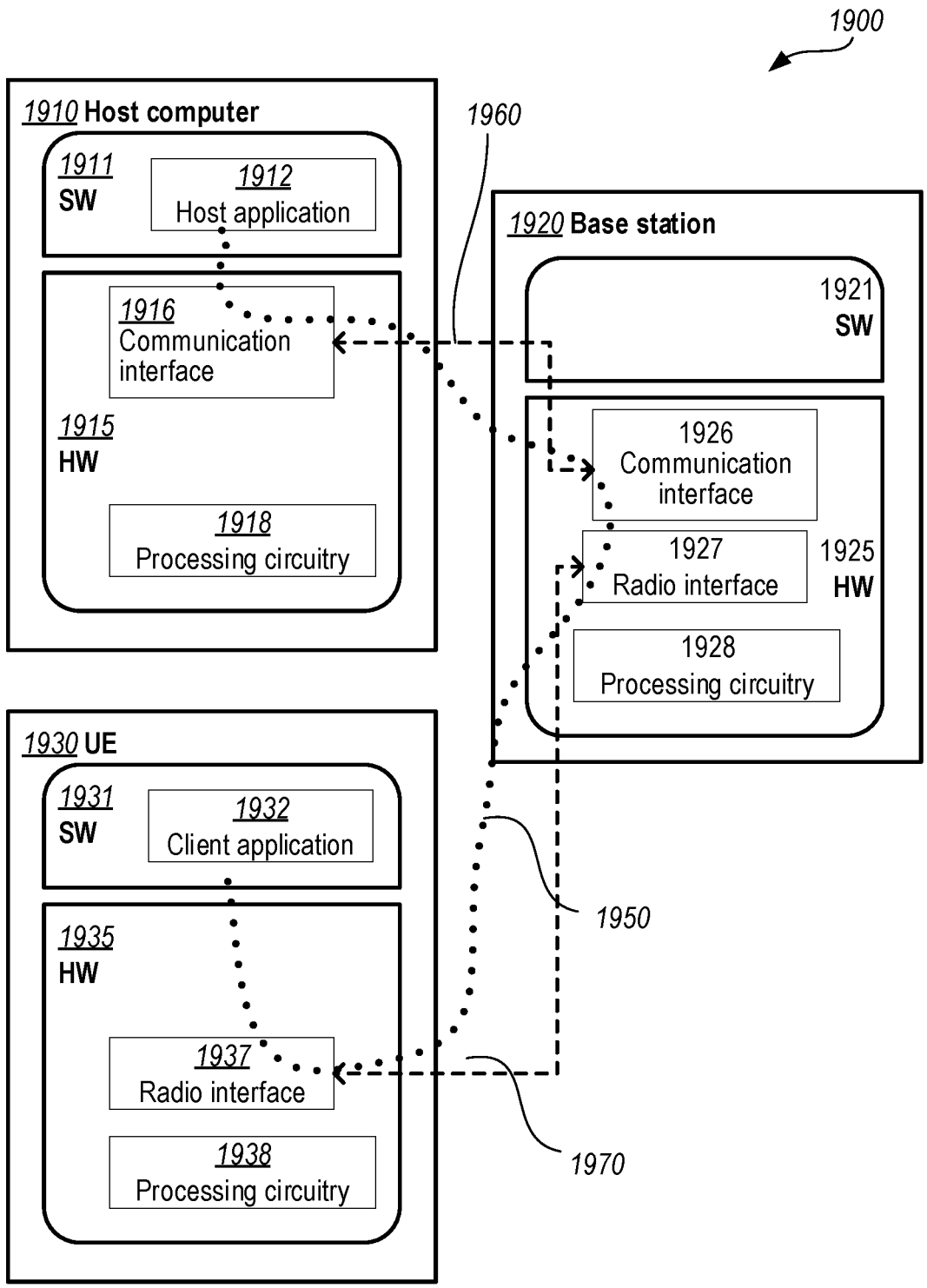

It is noted that host computer 1910, base station 1920 and UE 1930 illustrated in FIG. 19 can be similar or identical to host computer 1830, one of base stations 1812a, 1812b, 1812c and one of UEs 1891, 1892 of FIG. 18, respectively. This is to say, the inner workings of these entities can be as shown in FIG. 19 and independently, the surrounding network topology can be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure can determine the routing, which it can be configured to hide from UE 1930 or from the service provider operating host computer 1910, or both. While OTT connection 1950 is active, the network infrastructure can further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacitiy, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1950 between host computer 1910 and UE 1930, in response to variations in the measurement results. The measurement procedure and/or the network functionality for reconfiguring OTT connection 1950 can be implemented in software 1911 and hardware 1915 of host computer 1910 or in software 1931 and hardware 1935 of UE 1930, or both. In embodiments, sensors (not shown) can be deployed in or in association with communication devices through which OTT connection 1950 passes; the sensors can participate in the measurement procedure by supplying values of the monitored quantities exemplified above, or supplying values of other physical quantities from which software 1911, 1931 can compute or estimate the monitored quantities. The reconfiguring of OTT connection 1950 can include message format, retransmission settings, preferred routing etc.; the reconfiguring need not affect base station 1920, and it can be unknown or imperceptible to base station 1920. Such procedures and functionalities can be known and practiced in the art. In certain embodiments, measurements can involve proprietary UE signaling facilitating host computer 1910's measurements of throughput, propagation times, latency and the like. The measurements can be implemented in that software 1911 and 1931 causes messages to be transmitted, in particular empty or 'dummy' messages, using OTT connection 1950 while it monitors propagation times, errors etc.

FIG. 20 is a flowchart illustrating an exemplary method and/or procedure implemented in a communication system, in accordance with one embodiment. The communication system includes a host computer, a base station and a UE which, in some exemplary embodiments, can be those described with reference to FIGS. 18 and 19. For simplicity of the present disclosure, only drawing references to FIG. 20 will be included in this section. In step 2010, the host computer provides user data. In substep 2011 (which can be optional) of step 2010, the host computer provides the user data by executing a host application. In step 2020, the host computer initiates a transmission carrying the user data to the UE. In step 2030 (which can be optional), the base station transmits to the UE the user data which was carried in the transmission that the host computer initiated, in accordance with the teachings of the embodiments described throughout this disclosure. In step 2040 (which can also be optional), the UE executes a client application associated with the host application executed by the host computer.

FIG. 21 is a flowchart illustrating an exemplary method and/or procedure implemented in a communication system, in accordance with one embodiment. The communication system includes a host computer, a base station and a UE which can be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission can pass via the base station, in accordance with the teachings of the embodiments described throughout this disclosure. In step 2130 (which can be optional), the UE receives the user data carried in the transmission.

FIG. 22 is a flowchart illustrating an exemplary method and/or procedure implemented in a communication system, in accordance with one embodiment. The communication system includes a host computer, a base station and a UE which can be those described with reference to FIGS. 18 and 19. For simplicity of the present disclosure, only drawing references to FIG. 22 will be included in this section. In step 2210 (which can be optional), the UE receives input data provided by the host computer. Additionally or alternatively, in step 2220, the UE provides user data. In substep 2221 (which can be optional) of step 2220, the UE provides the user data by executing a client application. In substep 2211 (which can be optional) of step 2210, the UE executes a client application which provides the user data in reaction to the received input data provided by the host computer. In providing the user data, the executed client application can further consider user input received from the user. Regardless of the specific manner in which the user data was provided, the UE initiates, in substep 2230 (which can be optional), transmission of the user data to the host computer. In step 2240 of the method, the host computer receives the user data transmitted from the UE, in accordance with the teachings of the embodiments described throughout this disclosure.

FIG. 23 is a flowchart illustrating an exemplary method and/or procedure implemented in a communication system, in accordance with one embodiment. The communication system includes a host computer, a base station and a UE which can be those described with reference to FIGS. 18 and 19. For simplicity of the present disclosure, only drawing references to FIG. 23 will be included in this section. In step 2310 (which can be optional), in accordance with the teachings of the embodiments described throughout this disclosure, the base station receives user data from the UE. In step 2320 (which can be optional), the base station initiates transmission of the received user data to the host computer. In step 2330 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Exemplary embodiments of the present disclosure include, but are not limited to, the following enumerated examples:

1. A method, performed by a first integrated access backhaul (IAB) node in an IAB radio network, for providing hop-by-hop flow control of data transmission from a base station to a plurality of user equipment (UE) via the IAB network, the method comprising:
- detecting a reduction in data transmission throughput in the first IAB node;
- determining that the reduction in data transmission throughput is due to congestion in one or more particular southbound nodes in the IAB network; and
- sending a flow-control message to a second node that is serving the first IAB node in the IAB network, wherein the flow-control message identifies the one or more particular southbound nodes and a flow-control operation to be performed with respect to data transmitted from the second node to the one or more particular southbound nodes via the first node.

2. The method of embodiment 1, wherein the identified flow-control operation comprises stopping data transmission from the second node to the one or more particular southbound nodes via the first IAB node.

3. The method of embodiment 1, wherein the identified flow-control operation comprises reducing data transmission from the second node to the one or more particular southbound nodes via the first IAB node, and wherein the flow-control message further comprises one or more parameters specifying the amount of reduction for each of the particular southbound nodes.

4. The method of any of embodiments 1-3, wherein the flow-control message also identifies one or more further southbound nodes and a further flow-control operation to be performed with respect to data transmitted from the second node to the one or more further southbound nodes via the first IAB node.

5. The method of any of embodiments 1-3, wherein the flow-control message further identifies, for each particular southbound node, whether the flow-control operation should be applied to data transmitted from the second node to one or more further southbound nodes via the first node and the particular southbound node.

6. The method of any of embodiments 1-5, wherein the flow-control message further indicates a time period during which the flow-control operation should be performed by the second node.

7. The method of any of embodiments 1-6, wherein the flow-control message identifies the one or more particular southbound nodes based on identifying one or more radio bearers associated with one or more UEs being served by the one or more particular southbound nodes.

8. The method of any of embodiments 1-7, wherein the base station comprises a central unit (CU) and a distributed unit (DU) connected to the IAB radio network, and wherein the first IAB node and the second node are southbound with respect to the DU.

9. The method of any of embodiments 1-8, further comprising:
- determining that the congestion in the one or more particular southbound nodes has been relieved; and
- sending a subsequent flow-control message, to the second node, identifying the one or more particular southbound nodes and a subsequent flow-control operation to be performed with respect to the data transmitted from the second node to the one or more particular southbound nodes via the first node.

10. The method of any of embodiments 1-9, further comprising sending the flow-control message to a third node that is serving the second node in the IAB network.

11. A method, performed by a second node in an integrated access backhaul (IAB) radio network, for providing hop-by-hop flow control of data transmission from a base station to a plurality of user equipment (UE) via the IAB network, the method comprising:
- receiving, from a first node in the IAB network that is served by the second node, a flow-control message that identifies: one or more particular nodes in the IAB network that are southbound nodes with respect to the first node; and a flow-control operation to be performed, by the second node, with respect to data transmitted from the second node to the one or more particular southbound nodes via the first node; and
- Performing the identified flow-control operation; and
- Determining whether to send a further flow-control message, concerning the data transmitted from the second node to the one or more particular southbound nodes via the first node, to a third node that is serving the second node.

12. The method of embodiment 11, wherein the identified flow-control operation comprises stopping data transmission from the second node to the one or more particular southbound nodes via the first node.

13. The method of embodiment 11, wherein the identified flow-control operation comprises reducing data transmission from the second node to the one or more particular southbound nodes via the first node, and wherein the flow-control message further comprises one or more parameters specifying the amount of reduction for each of the particular southbound nodes.

14. The method of any of embodiments 11-13, wherein the flow-control message also identifies one or more further southbound nodes and a further flow-control operation to be performed with respect to data transmitted from the second node to the one or more further southbound nodes via the first node.

15. The method of any of embodiments 11-14, wherein the flow-control message further identifies, for each particular southbound node, whether the flow-control operation should be applied to data transmitted from the second node to one or more further southbound nodes via the first node and the particular southbound node.

16. The method of any of embodiments 11-15, wherein the flow-control message further indicates a time period during which the flow-control operation should be performed by the second node.

17. The method of any of embodiments 11-16, wherein the flow-control message identifies the one or more particular southbound nodes based on identifying one or more radio bearers associated with one or more UEs being served by the one or more particular southbound nodes.

18. The method of any of embodiments 11-17, wherein determining whether to send the further flow-control message is based on at least one of the following factors: data buffer levels at the second node; rate of change in data buffer levels at the second node; the flow-control operation performed by the second node; and the elapsed time since the flow-control message was received by the second node.

19. The method of any of embodiments 11-18, further comprising sending the further flow-control message to the third node.

20. The method of embodiment 19, wherein the further flow-control message encapsulates the flow-control message received by the second node.

21. The method of any of embodiments 11-20, further comprising:
- Receiving, from the first node, a subsequent flow-control message identifying the one or more particular southbound nodes and a subsequent flow-control operation to be performed with respect to the data transmitted from the second node to the one or more particular southbound nodes via the first node;

Performing the subsequent flow-control operation; and

If it was determined to send the further flow-control message to the third node, sending a subsequent further flow-control message to the third node in response to receiving the subsequent flow-control message from the first node.

22. The method of any of embodiments 11-21, wherein the base station comprises a central unit (CU) and a distributed unit (DU) connected to the IAB radio network, and wherein the first and second nodes are southbound with respect to the DU.

23. A node in an integrated access backhaul (IAB) radio network configured to provided hop-by-hop flow control of data transmission from a base station to a plurality of user equipment (UE) via the IAB network, the node comprising:
   a. A communication transceiver;
   b. processing circuitry operatively coupled to the communication transceiver and configured to perform operations corresponding to any of the methods of embodiments 1-22; and
   c. power supply circuitry configured to supply power to the node.

24. A communication system including a host computer comprising:
   a. processing circuitry configured to provide user data; and
   b. a communication interface configured to forward the user data to a cellular network for transmission to a user equipment (UE) through a core network (CN) and a radio access network (RAN);
   wherein:
   c. the RAN comprises first and second nodes of an integrated access backhaul (IAB) network;
   d. the first node comprises a communication transceiver and processing circuitry configured to perform operations corresponding to any of the methods of embodiments 1-10; and
   e. the second node comprises a communication transceiver and processing circuitry configured to perform operations corresponding to any of the methods of embodiments 11-22.

25. The communication system of embodiment 21, further comprising the UE configured to communicate with the IAB node.

26. The communication system of any of embodiments 18-19, wherein:
   a. the processing circuitry of the host computer is configured to execute a host application, thereby providing the user data; and
   b. the UE comprises processing circuitry configured to execute a client application associated with the host application.

27. A method implemented in a communication system including a host computer, a cellular network, and a user equipment (UE), the method comprising:
   a. at the host computer, providing user data;
   b. at the host computer, initiating a transmission carrying the user data to the UE via a cellular network comprising an integrated access backhaul (IAB) network; and
   c. operations, performed by first and second nodes of the IAB network, corresponding to any of the methods of embodiments 1-22.

28. The method of embodiment 27, wherein the data message comprises the user data, and further comprising transmitting the user data by the access node.

29. The method of any of embodiments 27-28, wherein the user data is provided at the host computer by executing a host application, the method further comprising, at the UE, executing a client application associated with the host application.

30. A communication system including a host computer comprising a communication interface configured to receive user data originating from a transmission from a user equipment (UE) to a base station via an integrated access backhaul (IAB) radio network, wherein:
   a. the IAB network comprises first and second nodes;
   b. the first node comprises a communication interface and processing circuitry configured to perform operations corresponding to any of the methods of embodiments 1-10; and
   c. the second node comprises a communication interface and processing circuitry configured to perform operations corresponding to any of the methods of embodiments 11-22.

31. The communication system of embodiments 30, further including the UE, wherein the UE is configured to communicate with the IAB node.

32. The communication system of any of embodiments 30-31, wherein:
   a. the processing circuitry of the host computer is configured to execute a host application;
   b. the UE is configured to execute a client application associated with the host application, thereby providing the user data to be received by the host computer.

The invention claimed is:

1. A method, performed by a first node in an integrated access backhaul (IAB) network, for flow control of data transmission from a base station to a plurality of user equipment (UEs) via the IAB network, the method comprising:
   detecting a reduction in data transmission throughput in the first node;
   determining that the reduction in data transmission throughput is due to congestion in one or more particular downstream nodes in the IAB network; and
   sending a flow-control message to an upstream node in the IAB network, wherein the flow-control message identifies one or more nodes, in the IAB network, for which a flow-control operation is requested in relation to data transmitted from the upstream node;
   wherein:
   the flow-control message also includes a flag;
   a first value of the flag indicates that a flow-control operation is requested in relation to data transmitted from the upstream node to the identified nodes; and
   a second value of the flag indicates that a flow-control operation is requested in relation to data transmitted from the upstream node to the identified nodes, and data transmitted from the upstream node to further downstream nodes via the identified nodes.

2. The method of claim 1, wherein at least one of the following applies:
   the flow-control message further indicates a time period during which a flow-control operation should be performed in relation to data transmitted from the upstream node to the identified nodes; and the flow-control message identifies the one or more nodes based on identifying one or more radio bearers associated with one or more UEs being served by the one or more nodes.

3. The method of claim 1, wherein the flow-control message also identifies the flow-control operation.

4. The method of claim 3, wherein the flow-control operation comprises stopping or reducing data transmission from the upstream node to the identified one or more nodes.

5. The method of claim 4, wherein for each identified node:
the flow-control message also includes one or more parameters indicating an amount of reduction of the data transmission; and
stopping the data transmission is indicated when the one or more parameters have a particular value.

6. The method of claim 3, wherein:
the flow-control message also identifies one or more further nodes in the IAB network for which a further flow-control operation is requested in relation to data transmitted from the upstream node; and
the flow-control message also identifies the further flow-control operation.

7. The method of claim 6, wherein:
the flow-control operation comprises one of the following:
stopping data transmission from the upstream node to the identified one or more nodes, or
reducing data transmission from the upstream node to the identified one or more nodes by a first amount; and
the further flow-control operation comprises one of the following:
continuing data transmission from the upstream node to the identified further nodes, or
reducing data transmission from the upstream node to the identified further nodes by a second amount.

8. The method of claim 1, further comprising sending the flow-control message to a further upstream node in the IAB network, wherein the further upstream node is upstream in relation to the upstream node.

9. The method of claim 1, further comprising:
determining that the congestion has been relieved in at least a portion of the particular downstream nodes; and
sending a subsequent flow-control message, to the upstream node, identifying at least one node for which a subsequent flow-control operation is requested based on the relieved congestion.

10. The method of claim 9, wherein:
the subsequent flow-control message also identifies the subsequent flow-control operation; and
the subsequent flow-control operation comprises resuming or increasing data transmission from the upstream node to the identified at least one node.

11. A method, performed by a second node in an integrated access backhaul (IAB) network, for flow control of data transmission from a base station to a plurality of user equipment (UEs) via the IAB network, the method comprising:
receiving a flow-control message from a downstream node in the IAB network, wherein the flow-control message identifies one or more nodes, in the IAB network, for which a flow-control operation is requested in relation to data transmitted from the second node via the downstream node;
performing one or more flow-control operations based on the flow-control message; and
determining whether to send a further flow-control message, concerning the data transmitted from the second node via the downstream node, to an upstream node in the IAB network;
wherein:
the flow-control message also includes a flag;
a first value of the flag indicates that a flow-control operation is requested in relation to data transmitted from the second node to the identified nodes; and
a second value of the flag indicates that a flow-control operation is requested in relation to data transmitted from the second node to the identified nodes, and data transmitted from the second node to further downstream nodes via the identified nodes.

12. The method of claim 11, wherein at least one of the following applies:
the flow-control message further indicates a time period during which a flow-control operation should be performed in relation to data transmitted from the second node to the identified nodes; and
the flow-control message identifies the one or more nodes based on identifying one or more radio bearers associated with one or more UEs being served by the one or more nodes.

13. The method of claim 11, wherein:
the flow-control message also identifies the flow-control operation; and
performing the one or more flow-control operations comprises performing the identified flow-control operation with respect to the identified one or more nodes.

14. The method of claim 13, wherein the flow-control operation comprises stopping or reducing data transmission from the second node to the identified one or more nodes.

15. The method of claim 14, wherein for each identified node:
the flow-control message further comprises one or more parameters indicating an amount of reduction of the data transmission; and
stopping the data transmission is indicated when the one or more parameters have a particular value.

16. The method of claim 13, wherein:
the flow-control message also identifies one or more further nodes in the IAB network for which a further flow-control operation is requested in relation to data transmitted by the second node; and
the flow-control message also identifies the further flow-control operation.

17. The method of claim 16, wherein:
the flow-control operation comprises one of the following:
stopping data transmission from the second node to the identified one or more nodes, or
reducing data transmission from the second node to the identified one or more nodes by a first amount; and
the further flow-control operation comprises one of the following:
continuing data transmission from the second node to the identified one or more further nodes, or
reducing data transmission from the second node to the identified one or more further nodes by a second amount.

18. The method of claim 16, wherein performing the one or more flow control operations comprises:
performing the identified flow-control operation with respect to the identified one or more nodes; and
performing the identified further flow-control operation with respect to the identified one or more further nodes.

19. The method of claim 11, wherein determining whether to send the further flow-control message is based on at least one of the following factors: data buffer levels at the second node; rate of change in data buffer levels at the second node; the one or more flow-control operations performed; and the elapsed time since the flow-control message was received by the second node.

20. The method of claim 11, further comprising sending the further flow-control message to the upstream node, wherein the further flow-control message encapsulates the flow-control message received by the second node.

21. The method of claim 11, further comprising:
receiving a subsequent flow-control message from the downstream node, wherein the subsequent flow-control message identifies at least one node, in the IAB network, for which a subsequent flow-control operation is requested in relation to data transmitted from the second node via the downstream node;
performing at least one flow-control operation based on the subsequent flow-control message; and
if it was determined to send the further flow-control message to the upstream node, sending a subsequent further flow-control message to the upstream node in response to receiving the subsequent flow-control message from the downstream node.

22. The method of claim 21, wherein
the subsequent flow-control message also identifies the subsequent flow-control operation; and
performing the at least one flow-control operation comprises performing the identified subsequent flow-control operation with respect to the identified at least one node.

23. The method of claim 22, wherein the subsequent flow-control operation comprises resuming or increasing data transmission to the identified at least one node.

24. An integrated access backhaul (IAB) node configured to provide flow control of data transmission from a base station to a plurality of user equipment (UEs) via an IAB network, the IAB node comprising:
communication interface circuitry configured to communicate with one or more other nodes in the IAB network; and
processing circuitry operably coupled with the communication interface circuitry, wherein the processing circuitry and the communication interface circuitry are configured to perform operations corresponding to the method of claim 1.

* * * * *